United States Patent [19]
Takahara

[11] Patent Number: 5,394,259
[45] Date of Patent: Feb. 28, 1995

[54] MODULATION/DEMODULATION APPARATUS AND INFORMATION PROCESSING APPARATUS

[75] Inventor: Hideki Takahara, Tokyo, Japan

[73] Assignee: Sony Corporation, Japan

[21] Appl. No.: 22,737

[22] Filed: Feb. 24, 1993

[30] Foreign Application Priority Data

Feb. 25, 1992 [JP] Japan .................................. 4-073262
Nov. 18, 1992 [JP] Japan .................................. 4-309099

[51] Int. Cl.⁶ ............................................. H04B 10/00
[52] U.S. Cl. ................................. 359/142; 359/143; 359/167; 359/172; 359/182
[58] Field of Search .................. 359/142, 147–148, 359/152, 154, 167, 172, 174, 176, 181–182, 113, 143; 340/825.19; 375/45

[56] References Cited

U.S. PATENT DOCUMENTS

| | | | |
|---|---|---|---|
| 3,953,727 | 4/1976 | D'Auria et al. | 250/199 |
| 4,682,352 | 7/1987 | Durham | 379/98 |
| 4,809,257 | 2/1989 | Gantenbein et al. | 359/172 |
| 4,959,874 | 9/1990 | Saruta et al. | 359/172 |
| 4,975,926 | 12/1990 | Knapp | 359/172 |
| 4,977,618 | 12/1990 | Allen | 359/172 |
| 5,046,187 | 9/1991 | Takahashi | 379/93 |
| 5,075,792 | 12/1991 | Brown et al. | 359/152 |
| 5,077,552 | 12/1991 | Abbate | 340/825 |
| 5,081,711 | 1/1992 | Rickman, Jr. | 359/146 |
| 5,189,543 | 2/1993 | Lin et al. | 359/154 |
| 5,239,295 | 8/1993 | DeLuca et al. | 359/147 |

FOREIGN PATENT DOCUMENTS

| | | | |
|---|---|---|---|
| 0249205 | 12/1987 | European Pat. Off. | |
| 0249205A2 | 12/1987 | European Pat. Off. | H04M 11/06 |
| 3922041 | 1/1991 | Germany | 359/149 |
| 0260938 | 10/1989 | Japan | 359/142 |
| 2234377A | 1/1991 | United Kingdom | G08C 23/00 |

OTHER PUBLICATIONS

"Curser Controller/Graphics Pad", IBM Technical Disclosure Bulletin, vol. 28, No. 9, Feb. 1986. pp. 4093–4097.

Primary Examiner—Richard E. Chilcot, Jr.
Assistant Examiner—Kinfe-Michael Negash
Attorney, Agent, or Firm—Limbach & Limbach

[57] ABSTRACT

A modulation/demodulation apparatus includes a modulator for modulating data. When a central processing unit is operating in a first operating mode, a changeover unit selects and outputs modulated data signals provided by the modulator. When the central processing unit is operating in a second operating mode, the changeover unit selects and outputs unmodulated data signals. An IR light emitter outputs IR light corresponding to the data signals selected and output by the changeover unit.

21 Claims, 17 Drawing Sheets

1.3MHz

MODULATION/DEMODULATION APPARATUS AND INFORMATION PROCESSING APPARATUS

BACKGROUND OF THE INVENTION

This invention relates to a modulation/demodulation system or apparatus, for example, a modulation/demodulation system or apparatus for outputting infrared rays modulated by transmission data modulated with FSK (frequency shift keying) or by the base-band transmission data, and an information processing system or apparatus.

In data communication between an information processing system, such as a personal computer, and a peripheral equipment, such as a printer, there is a system employing a modulation/demodulation system (modem), besides a system of directly coupling the equipment by a cable.

Among the modems, there is a modem which effects a close range data communication using light communication, such as infrared rays, referred to hereinafter as infrared or IR modem, besides a modem employing cable connection between the equipment. The modems employing the infrared rays are employed nowadays extensively because there is no necessity of connecting the IR modems with a cable, and the equipment can be installed or moved easily.

Meanwhile, due to increase in memory IC capacity, high IC integration and high density packaging, personal computers are reduced in size, such that portable personal computers or pocketable personal computers, or so-called electronic memoranda, are used extensively. Since these personal computers are small-sized, the above-mentioned IR modems are effective for data communication. Some versions of the personal computers are provided with built-in IR modems.

The present Assignee has proposed a portable information processing system having light data transmitting function in our co-pending JP Patent Application No. 2-298983 corresponding to U.S. patent application Ser. No. 07/787,037, now U.S. Pat. No. 5,210,927. The system includes two portable information processing units, each having on its upper surface a transmission section having light emitting devices and a receiving section having light receiving devices for effecting light data transmission, these units having their upper surfaces abutted against each other to effect data transmission and reception.

Among commonplace well-known apparatus for effecting data transmission using IR light, there are remote control commanding units, or commanders, for operating TV receivers or video tape recorders by a remote control operation.

Meanwhile, there is a demand for remote controlling electronic equipment, such as TV receiver or a video tape recorder, by a personal computer. However, it becomes necessary in this case to add an interfacing circuit in order to effect a commander function not present in the personal computer, with consequent rise in costs. Besides, such addition of the interfacing circuit to the portable personal computer leads to an increased size of the personal computer.

OBJECT AND SUMMARY OF THE INVENTION

In view of the above-described status of the art, it is an object of the present invention to provide a modulation/demodulation system or apparatus and an information processing system or apparatus which is composed of a small number of component parts and small-sized and which renders it possible to effect data communication between personal computers and between a personal computer and a peripheral equipment or to effect remote control of an electronic equipment, such as a TV receiver.

The present invention provides a modulation/demodulation apparatus comprising modulation means for modulating transmission data in accordance with a predetermined modulation system, changeover means for changing over and selecting modulated signals from the modulation means or transmission data, and IR light emitting means for emitting the IR light modulated by modulated signals or by the transmission data as selected by the changeover means.

The present invention also provides an information processing apparatus comprising central processing means having first and second operating modes and adapted for generating transmission data, modulating means for modulating the transmission data from the central processing means, changeover means for changing over and selecting modulated signals from the modulating means or the transmission data, and IR light emitting means for outputting IR light modulated by the modulated signals or by the transmission data as selected by the changeover means, said central processing means controlling the changeover means for selecting the modulated signals from the modulating means or the transmission signals in the first operating mode and in the second operating mode, respectively.

The IR light emitting means of the modulation/demodulation apparatus and the information processing apparatus according to the present invention include at least two IR light emitting devices outputting IR rays of different wavelengths.

The modulation/demodulation apparatus according to the present invention outputs IR light rays modulated by modulated signals modulated in accordance with a predetermined modulation system, such as FSK modulation system, or by transmission data, such as remote control signals.

With the information processing apparatus according to the present invention, the changeover means is controlled for selecting the modulated signals from the modulation means and the transmission data in the first and second operating modes, respectively, for outputting the IR light modulated by the modulated signals modulated in accordance with a predetermined modulation system, such as FSK modulation, or by the transmission data, such as remote control data, in the first and second operating modes, respectively.

On the other hand, with the modulation/demodulation apparatus according to the present invention, the IR light rays of at least two wavelengths, modulated by signals modulated by a predetermined modulation system, such as FSK modulation, or by the transmission data, such as remote control data, are outputted simultaneously.

Also, with the modulation/demodulation apparatus according to the present invention, the IR rays of at least two wavelengths, modulated by signals modulated by a predetermined modulation system, such as FSK modulation, and the IR rays of at least two wavelengths, modulated by transmission data, such as remote control data, are outputted simultaneously in the first operating mode and in the second operating mode, respectively.

Other objects and advantages of the present invention will become apparent from the following explanation of the preferred embodiments and the claims.

DETAILED DESCRIPTION OF THE PREFERRED EMBODIMENTS

Figure 1:
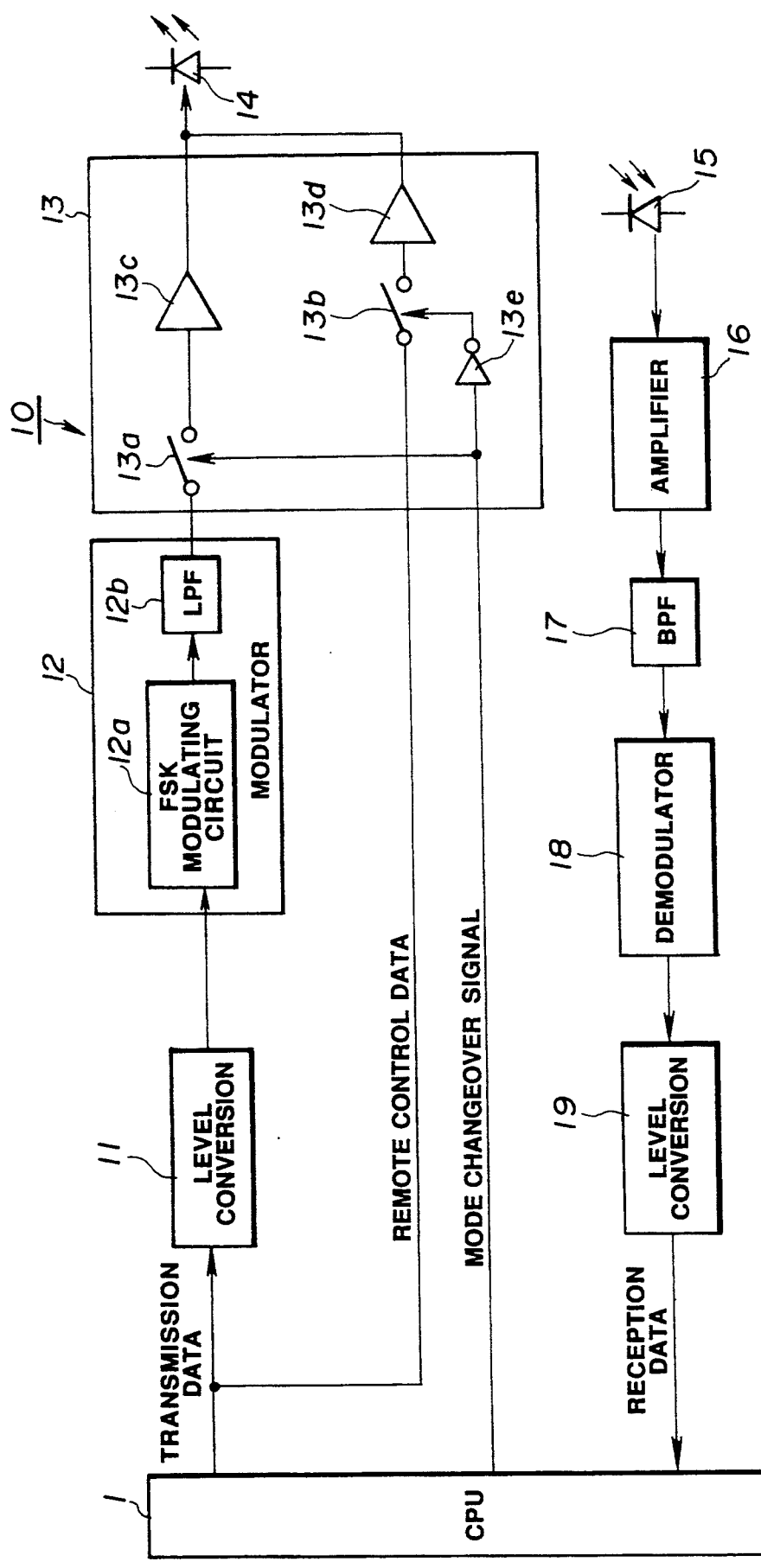
FIG. 1 is a block diagram showing a circuit arrangement of the information processing apparatus to the present invention.

Referring to the drawings, preferred embodiments of the modem and the information processing apparatus of the present invention are explained. FIG. 1 is a block diagram showing a circuit arrangement of the information processing apparatus according to the present invention, and FIG. 2 is a block diagram showing the circuit arrangement of the information processing apparatus shown in FIG. 1.

The information processing apparatus in its entirety is first explained. The information processing apparatus is a portable small-sized information processor, as an example, referred to hereinafter as a personal computer. The personal computer includes a central processing unit (CPU) 1 having first and second operating modes and adapted for running an application program and generating transmission data, an IR interfacing unit 10 for effecting data communication with external equipment under control of CPU 1, a memory unit 20 in which a system program is stored, a display section 30, a voice processing unit 40 for producing the voice as an output, a key entry unit 50 for making key entry, a function extension unit 60 for connection of an IC card, and a power source 70 for supplying the power to the above units, with the units from CPU 1 to the function extension unit 60 being interconnected over a bus 2, as shown in FIG. 2.

The personal computer is adapted for running various application programs, effecting data communication with peripheral equipment, such as other personal computers, printers or disc apparatus, and for controlling television receivers or video tape recorders which may be remote controlled using a remote control commander.

Figure 2:
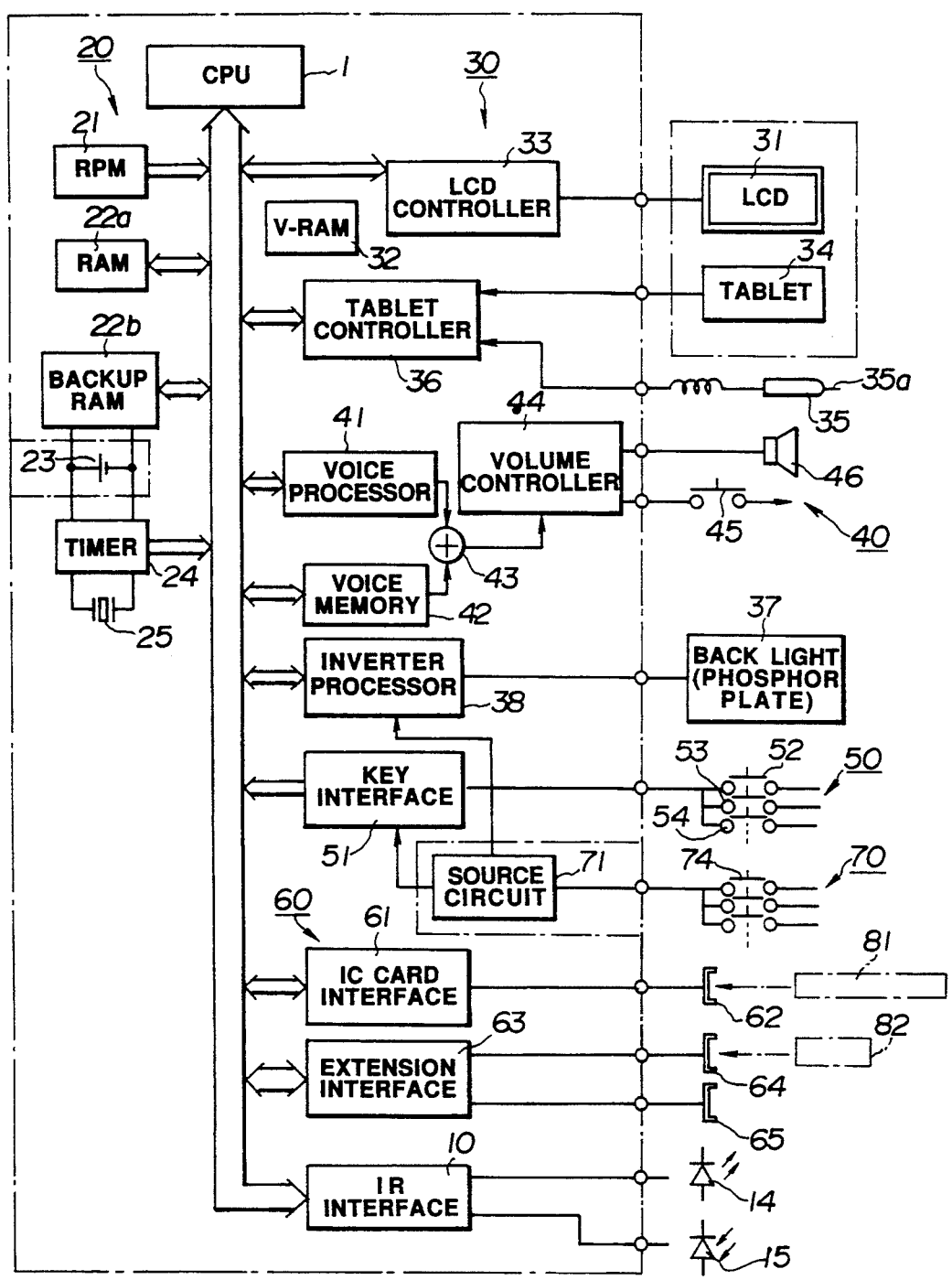
FIG. 2 is a block diagram showing a circuit arrangement of the information processing apparatus shown in FIG. 1.

The memory unit 20 is made up of a read-only memory (ROM) 21 in which the system program etc. is stored, random access memories (RAMs) 22a, 22b in which data required for running the application programs or data required for operation is optionally stored, a battery 23 for holding the memory contents of RAM 22b, a timer 24 for controlling the time, and a quartz oscillator 25 for supplying clocks to timer 24, as shown in FIG. 2.

In ROM 21, an application program, such as a kana-kanji conversion program and a dictionary table therefor, as word processor function, a hand-written input recognition program and a dictionary table therefor, a program for remote control of television receivers and remote control data therefor, are prestored, in addition to the system program for controlling the operation of the personal computer in its entirety. In RAN 22b, backed up by battery 23, data necessary to be held after the power source is turned off, such as schedule, addresses etc., and remote control data acquired by learning, are stored. CPU 1 executes various application programs, based on the program stored in ROM 21, to cause the results of program execution to be displayed on the display unit 30. In the data communication mode, as the first operating mode, CPU 1 effects data communication with other personal computers, via IR interface 10, with a file stored in the memory unit 20, as an example, as transmission data, or effects printing by transmitting print data to a printer. In the remote control data transmission mode, as the second operating mode, CPU 1 transmits remote control data stored in the memory unit 20 as transmission data to a TV receiver via IR interface 10 for remote controlling the TV receiver.

The display unit 30 is made up of a liquid crystal display (LCD) 31 for displaying an image, an image memory 32 for storing image data to be displayed on LCD 31, an LCD controller 33 for controlling the LCD 31 based on image data stored in image memory 32, a tablet 34 for entering position data on the screen of LCD 31, a pen 35 for entering position data using the tablet 34, a tablet controller 36 for controlling the tablet 34, a phosphor plate 37 for radiating the light from the back side of the LCD 31, and an inverter circuit 38 for converting the voltage supplied from the power source unit 70 into a predetermined voltage for supplying electrical energies to the phosphor plate 37, as also shown in FIG. 2.

The LCD controller 33 causes the image data read out from memory unit 20 under control by CPU 1 and supplied thereto over bus 2 to be stored in image memory 32, while causing the stored image to be read out so as to be supplied to LCD 31.

The LCD 31 has 512 horizontal electrodes and 342 vertical electrodes, in association with 512×342 pixels, for realizing a predetermined resolution, while having a driving circuit, not shown, for applying a predetermined voltage to these electrodes. The driving circuit sequentially applies the predetermined voltage to the 342 vertical electrodes, while sequentially applying the predetermined voltage to the horizontal 512 electrodes, based on the image data supplied via LCD controller 33. The result is that the pixels of the LCD 31 are scanned so that the image is displayed on the LCD 31.

The tablet 34 is formed of a transparent material and is arranged on the outer side of LCD 31 to permit the image displayed on LCD 31 to be viewed therethrough. The tablet 34 has 512 horizontal (X-direction) electrodes and 342 vertical (Y-direction) electrodes, in keeping with the predetermined resolution, for example, the above-mentioned resolution of LCD 31, while having a clock generator, not shown, for applying a predetermined voltage to these electrodes. The clock generator sequentially applies the predetermined voltage to the vertical 342 electrodes and 512 horizontal electrodes under control of the tablet controller 36 for scanning the tablet 34. The pen 35 has an end switch 35a so that, when the pen 35 is approached to tablet 34, a predetermined capacitance is generated between tablet 34 and pen 35. When the pen 35 is thrust against tablet 34, switch 35a is turned on. Tablet controller 36 senses the position thrust by pen 35 by sensing the electrical charges generated between pen 35 and the electrode of tablet 34 when switch 35a is turned on. The position data (coordinate values) thus detected is supplied to CPU 1. CPU 1 perpetually monitors the position at which the switch 35a is turned on, that is when the pen is placed on tablet 34 (pen-down), and the position at which the switch 35a is turned off, that is when the pen is moved away from and above tablet 34 (pen-up), so that CPU 1 determines and accepts the input on pen-down and pen-up, respectively.

The phosphor plate 37 is a so-called background light for LCD 31 and an inverter circuit changes over the brightness of the background light in e.g. two stages under control by CPU 1.

The voice processing unit 40 is made up of a voice processor 41 for converting voice data into voice signals under control by CPU 1, a voice memory 42 in which voice data associated with predetermined voice is previously stored, an additive node 43 for summing voice signals from voice processor 41 to voice signals which are based on voice data stored in voice memory 42, a sound volume controller 44 for adjusting the level of the voice signals summed in the additive node 43, a sound volume changeover switch 45 for supplying a sound volume changeover signal to sound volume controller 44, and a speaker 46 for outputting a sound based on the voice signals from sound volume controller 44, as shown in FIG. 2.

The voice processor 41 converts the voice data transmitted from e.g. the function extension unit 60 into voice signals. The additive node 43 sums the voice signals to the voice signals which are based on the voice data stored in voice memory 42. The sound volume controller 44 changes over the level of the voice signals from additive node 43 in e.g. three stages by signals which are based on turning on/off of sound volume changeover switch 45. The voice signals, thus adjusted in level in three stages, are supplied to a speaker 46. The result is that the speaker 46 generates the sound which is based on voice data transmitted to function extension unit 60 or, if the user has performed a mistaken operation, generates an alarm sound "oh!" which is based on the voice data stored in voice memory 42.

The key entry section 50 has a key interface 51 to which are connected e.g. a brightness adjustment switch 52 for adjusting the brightness of LCD 31, a changeover switch 53 for adjusting the light volume of the phosphor plate 37 and a stop switch 54 for stopping a predetermined operation, as shown in FIG. 2. The key interface 51 supplies signals associated with the turning on and off of these switches to CPU 1, which controls LCD controller 33 and inverter circuit 38 based on these signals for controlling the brightness of LCD 31, brightness of the background light, etc.

The function extension unit 60 is made up of an IC card interface 61, a socket 62 for connecting the IC card interface 61 with an IC card 81, an extension interface 63 and sockets 64, 65 for connecting the extension interface 63 to peripheral equipment. The IC card interface 61 exchanges data and programs with IC card 81, while extension interface 63 exchanges data with peripheral equipment, such as disc apparatus 82, or with modems communicating with remote personal computers over telephone lines, as also shown in FIG. 2.

The power source unit 70 includes a power source circuit 71 for converting the power supplied via enclosed battery 72 and Ac adapter, not shown, into a predetermined voltage which is supplied to the above-mentioned various components. To the power source circuit 71 is connected e.g. a power source switch 74 which may be turned on to supply the electric power to the above-mentioned various components, as also shown in FIG. 2.

The remote control operation for television receiver and data communication with other personal computers via the above-mentioned IR interface 10 is hereinafter explained.

The IR interface 10 is made up of a level converter 11 for converting the level of transmission data from CPU 1 into data of a predetermined level, a modulator 12 for modulating the level-converted transmission data from level converter 11 in accordance with a predetermined modulation system, a driver 13 for selecting one of the modulated signals from modulator 12 and the transmission data and amplifying the selected signals, an IR LED 14 for outputting IR rays modulated by the modulated signals or the transmission data as selected by driver 13, a photodiode 15 for converting IR rays transmitted thereto from other personal computers into electrical signals, an amplifier 16 for amplifying RF signals from photodiode 15, a band-pass filter (BPF) 17 for transmitting a predetermined bad component of the RF signals amplified by amplifier 16, a demodulator 18 for demodulating the RF signals freed of noise components by BPF 17 for reproducing reception data, and a level converter 19 for converting the level of the reception data from demodulator 19 into predetermined level data, as shown in FIG. 1.

Figure 3:
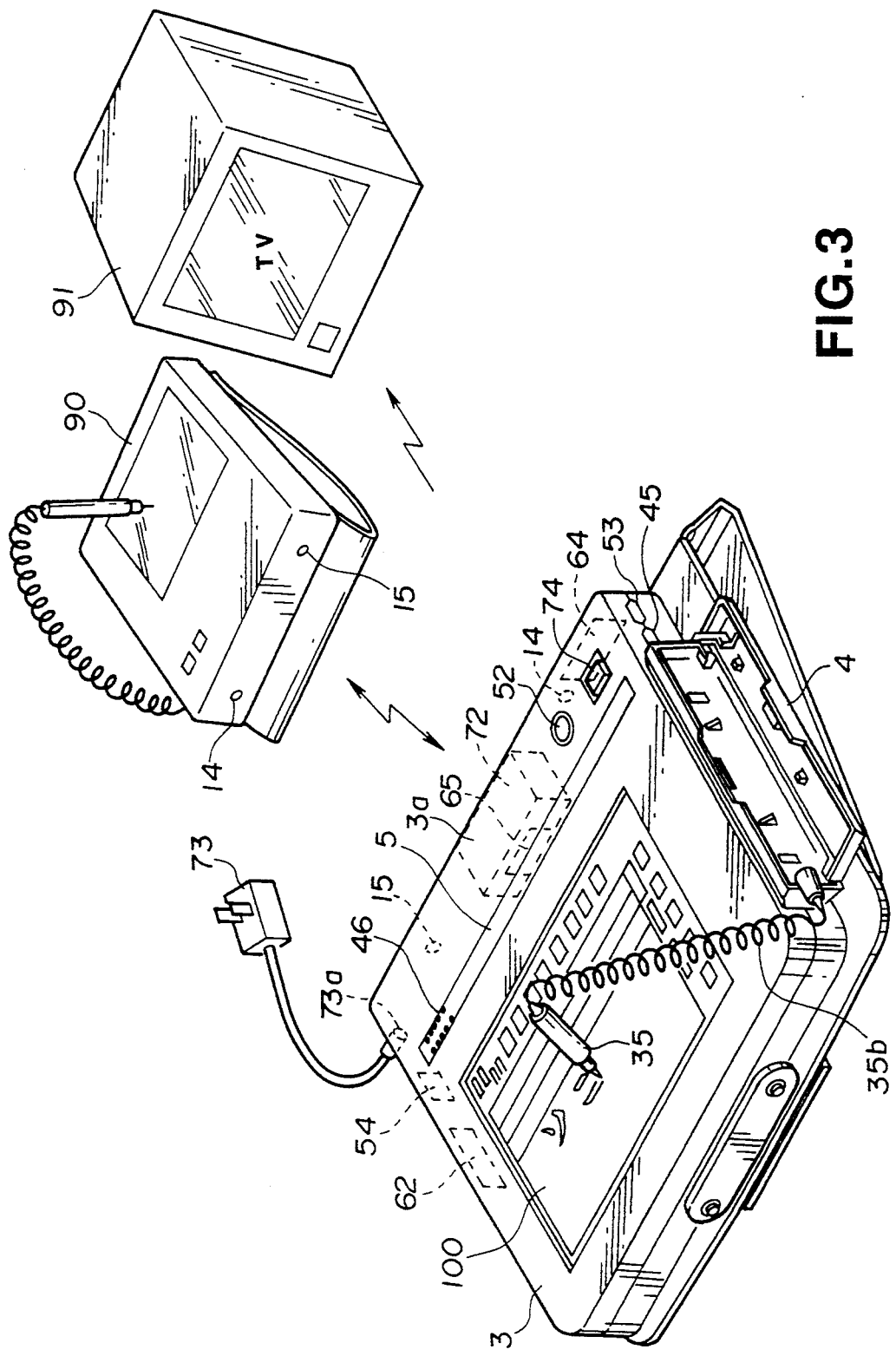
FIG. 3 is a perspective view showing the information processing apparatus and the overall system.

CPU 1 causes the driver 13 to select modulated signals from modulator 12 and transmission data from CPU 1 in the data communication mode and in the remote control data transmission mode, respectively, while causing data communication with other personal computers 90 or remote control of a television receiver 91 etc. to be performed using IR LED 14, as shown in FIG. 3.

The appearance of the personal computer is briefly explained.

At a mid part on the top of a main body 3, LCD 31 is arranged as a display 100, and the brightness switch 52 and the power source switch 74 are arranged at predetermined sites, as shown in FIG. 3.

A casing 4 is provided at a right side of the main body. When the pen 35, connected to the main body 3 via cord 35b, is not in use, it is housed within the casing 4. When taken out of the casing 4, the pen 35 may be arranged within a housing groove 5 which is formed horizontally on the top of the main body 3. The speaker 46 is provided on the left side of the groove 5, while the sound volume changeover switch 53 is provided at a predetermined site on the right side of the main body 3.

The stop switch 54 and the socket 62 are arranged on the left side of the main body 3. On this left side, there is also provided a connection terminal 73a connected to the AC adapter 73.

The IR LED 14, photodiode 15 and the socket 64 are provided at predetermined sites on the rear side of the main body 3. On this rear side, within a loading unit 3a for batteries 72, there is mounted the socket 65. Data communication with other personal computers 90 is performed using the IR LED 14 and the photodiode 14 provided on the rear side, while remote communication of the TV receiver 91 is also performed using the IR LED 14.

Concretely, level converter 11 consists in a resistance type voltage divider for converting the amplitude of the transmission data supplied from CPU 1 from e.g. 5 $V_{P-0}$ to 2.5 $V_{P-0}$ for transmitting the amplitude-converted transmission data to modulator 12.

The modulator 12 consists in a modulating circuit made up of an FSK (frequency shift keying) modulating circuit 12a and a low-pass filter (LPF) 12b, as shown in FIG. 1. The FSK modulating circuit 12a consists in a voltage-controlled oscillator for changing the oscillation frequency using a variable capacitance diode (varicap diode) and controls the capacitance of the of the varicap diode with the level-converted transmission data. Thus the carrier wave of 1.3 MHz is frequency-shifted to 1.35 MHz and to 1.25 MHz for 5 V transmission data, that is logical 1 transmission data, and 0 V transmission data, that is logical 0 transmission data, respectively. The resulting modulated signals are freed of high harmonics by LPF 12b having a cut-off frequency of 2.5 MHz before being supplied to driver 13. Besides the FSK modulation system, any of a number of digital modulation systems, such as so-called PSK, MSK or GMSK modulation systems, may be employed as the modulation system for modulator 12.

The driver 13 is made up of a switch 13a for turning the output of modulator 12 on and off based on a mode changeover signal from CPU 1, a switch 13b for turning transmission data from CPU 1 on and off, an amplifier 13c for amplifying the output of switch 13a for driving IR LED 14, an amplifier 13d for amplifying an output of switch 13b for driving IR LED 14 and an inverter 13e for inverting the mode changeover signal from CPU 1 for controlling the switch 13b, as shown in FIG. 1.

The switches 13a, 13b are controlled by the mode changeover signals from CPU 1 such that the switches 13a and 13b are turned on and off, respectively, in the data communication mode, while the switches 13b and 13a are turned on and off, respectively, in the remote control mode. The result is that the IR LED 14 outputs FSK modulated IR rays, that is the IR rays modulated by modulation signals from modulator 12, in the data communication mode, while outputting IR rays modulated by transmission data from CPU 1, that is IR rays directly modulated by base-band signals, in the remote control data transmission mode.

Figure 4:
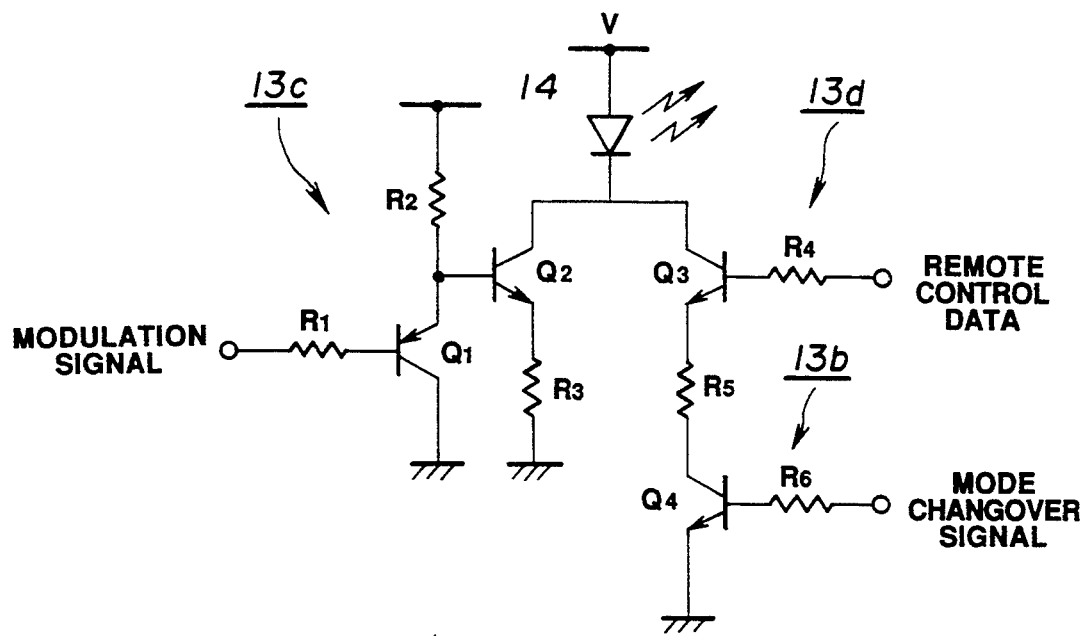
FIG. 4 shows a circuit arrangement of an amplifier as a component part of the information processing apparatus.
Figure 5:
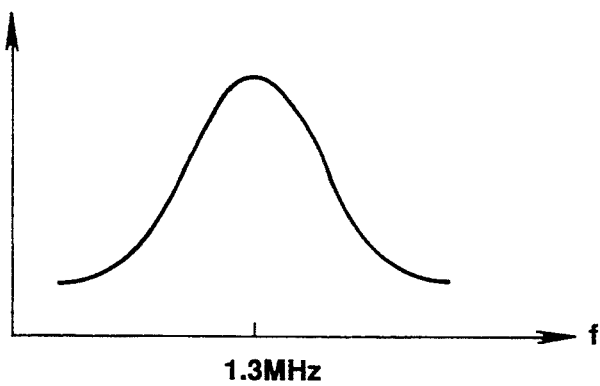
FIG. 5 is a graph showing characteristics of a BPF as a component part of the information processing apparatus.

A concrete circuit arrangement of the amplifiers 13c, 13d is explained. The amplifier 13c consists in a directly coupled transistors $Q_1$, $Q_2$, with the collector of the second stage transistor $Q_2$ being connected to the cathode of the IR LED 14, as shown for example in FIG. 4. The amplifier 13d consists in a switching transistor $Q_3$ having its collector connected to the cathode of the IR LED 14 and having its emitter connected via resistor $R_5$ to the collector of a switching transistor $Q_4$ constituting the switch 13b. In the data communication mode, transistor $Q_4$ is turned off by mode changeover signal, while the modulation signals are amplified by transistors $Q_1$, $Q_2$ for driving the IR LED 14 for outputting FSK modulated IR rays. In the remote control mode, the modulation signals entered to transistor $Q_1$ are cut off by the aforementioned switch 13a for turning off transistor $Q_2$, while transistor $Q_4$ is turned on by mode changeover signal and switching transistor $Q_3$ is driven by transmission data for outputting IR rays directly modulated by the transmission data. $R_1$ to $R_6$ denote resistors, such as base resistor, load resistor or bias resistor etc.

The FSK modulated IR rays or IR rays directly modulated with transmission data are outputted to personal computer 90 or television receiver 91, as shown in FIG. 3. Since the IR rays radiated in the remote control data transmission mode are not FSK modulated, personal computer 90 cannot receive the transmission data. On the other hand, if the remote control data are sent out as transmission data, the television receiver 91 receives the remote control data to effect channel switching or sound volume adjustment. That is, an equipment that can be remote controlled by IR rays, such as television receiver 91, can be controlled using the personal computer.

On the other hand, the IR rays sent out in the data communication mode are FSK modulated so that the television receiver 91 is unable to receive the transmission data and hence is not remote control led. However, the personal computer 90 receives the transmission data to enable data communication between personal computers.

Concretely, the FSK modulated IR rays are received by photodiode 15 and thereby converted into electrical signals, with the resulting RF signals being supplied to amplifier 16, as shown in FIG. 1. Amplifier 16 amplifies the RF signals to supply the amplified signals to BPF 17. BPF 17 is a band-pass filter having a center frequency of 1.3 MHz and frees the RF signals of noise to transmit the noise-free RF signals to demodulator 18.

Demodulator 18 is a counterpart of the modulator 12 on the transmitting side and hence consists in an FSK demodulator demodulating the RF signals for reproducing the data (reception data). Level converter 19 raises the level of the reception data to supply the reception data having the level of 5 $V_{P-0}$ to CPU 1. This allows data communication to be performed between personal computers.

Figure 6:
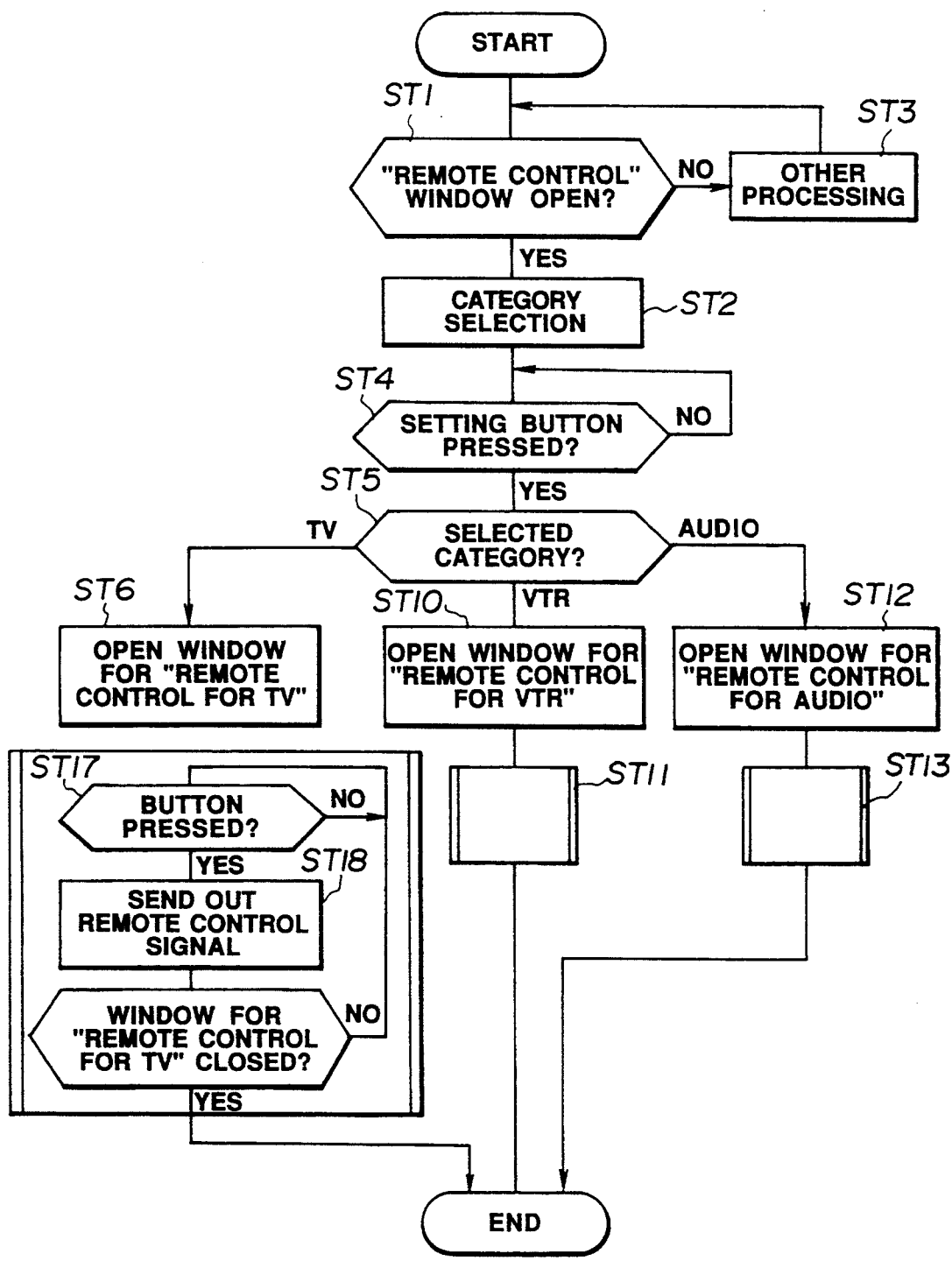
FIG. 6 is a flow chart for illustrating the operation in a remote control data emitting mode of a CPU as a component part of the information processing apparatus.

Referring to a flow chart of FIG. 6, the operation of CPU 1 in the remote control data transmission is explained.

Figure 7:
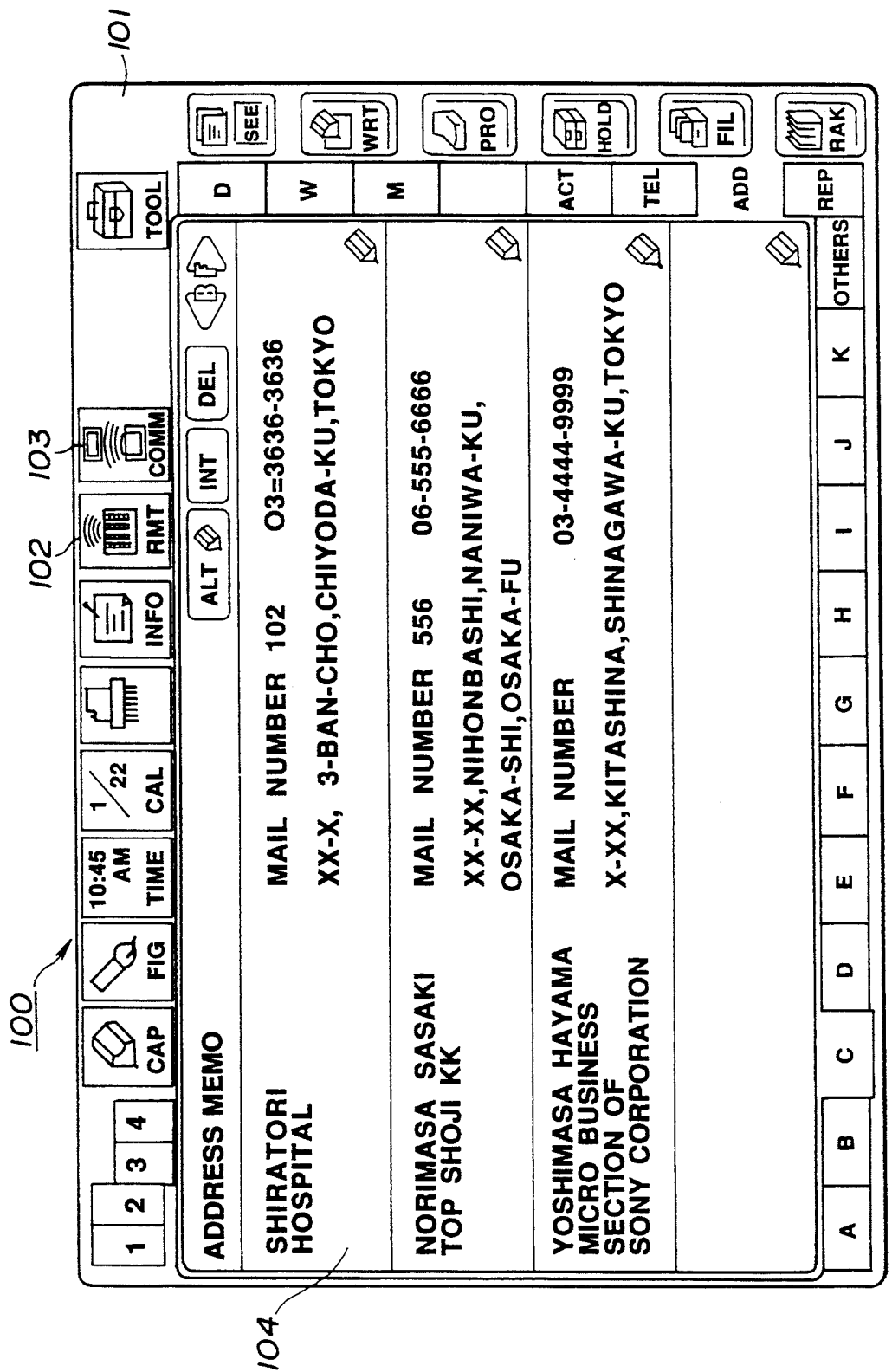
FIG. 7 is a front view showing an example of a screen display.
Figure 8:
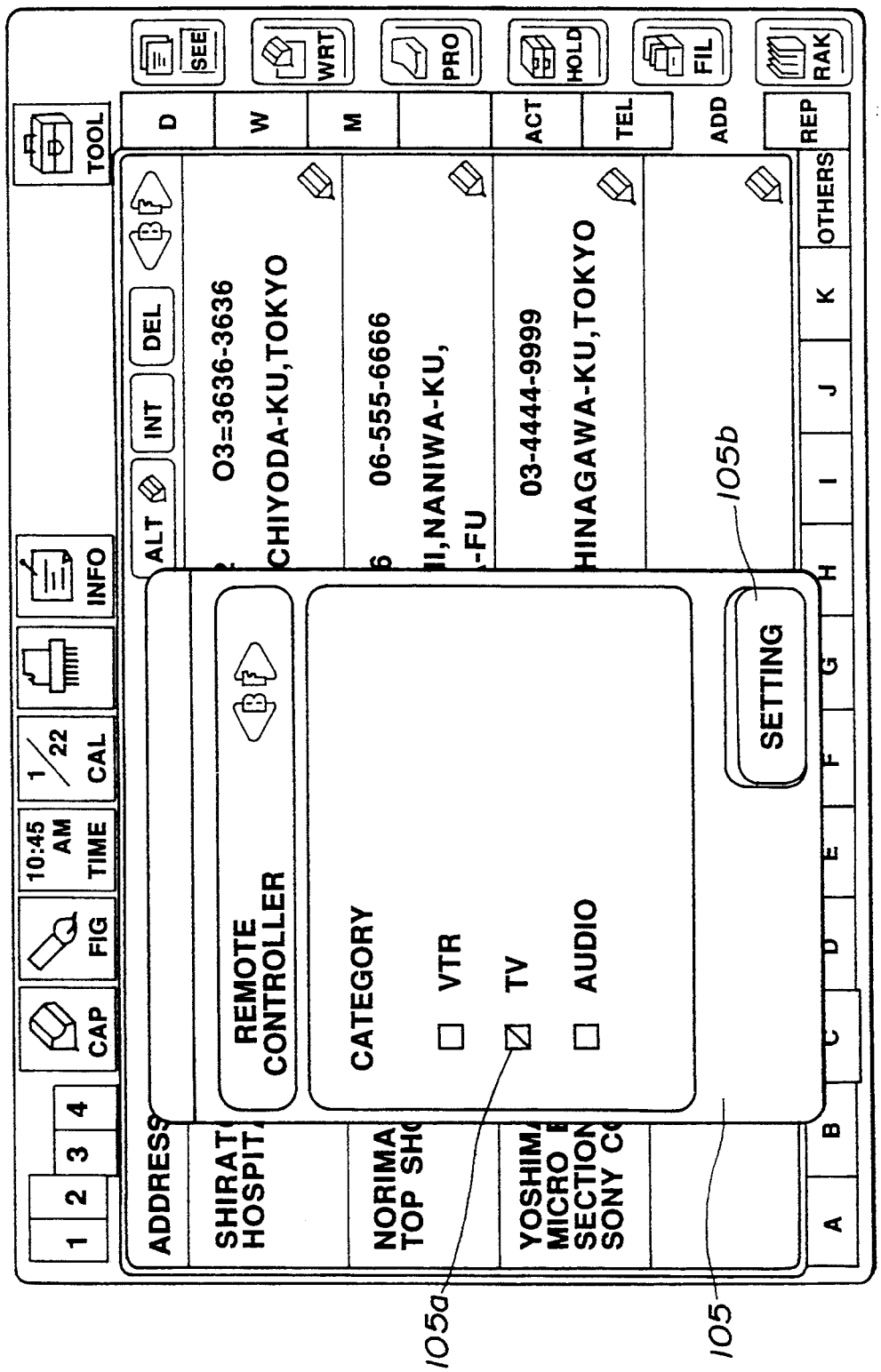
FIG. 8 is a front view showing another example of a screen display.

At step ST1, CPU 1 checks if user has set the remote control data transmission mode and if a "remote control" window has been opened on a screen 100 of LCD 1. If the result is YES, CPU proceeds to step ST2. If the result is NO, CPU proceeds to step ST3 to execute other operations before returning to step ST1. Concretely, an eye command "remote control" 102, an eye command "communication" 103 etc. are displayed in an eye command area 101 of the screen 100, as shown in FIG. 7. If user puts pen 35 on eye command "remote control" 102 (pen-down), and shifts pen 35 directly to an input display area 104, after which user lifts pen 35 (pen-up), CPU 1 senses the pen-up and pen-down as explained hereinabove to open a window 105 indicating the categories (types or kinds) of an equipment to be remote controlled, such as a video tape recorder (VTR), television receiver (TV) or audio, as shown in FIG. 8, before proceeding to step ST2.

If user puts pen 35 at an eye command indicating a desired equipment, such as an eye command 105a for "TV", to select the television receiver, CPU 1 senses it to proceed to step ST4.

At step ST4, CPU 1 checks if user puts pen 35 on an eye command "set" 105b. If the result is YES, CPU proceeds to step ST5 and, if otherwise, CPU remains in a standby state.

At step ST5, CPU 1 checks which category has been selected at step ST2. If the category selected is TV, CPU proceeds to step ST6. If it is VTR or audio, CPU proceeds to step ST10 or step ST12, respectively.

Figure 9:
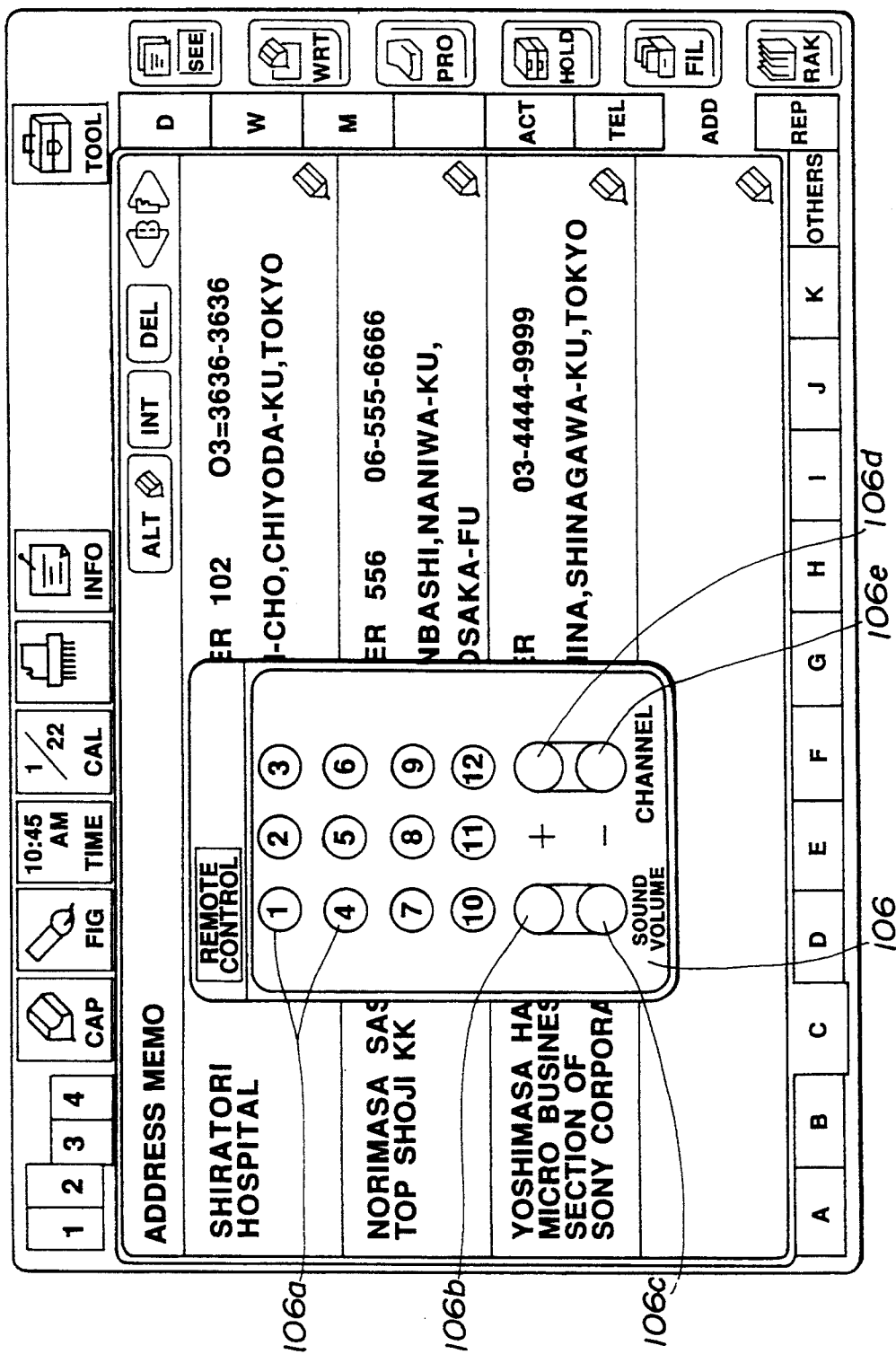
FIG. 9 is a front view showing yet another example of a screen display.

At step ST6, CPU 1 opens the window for "remote control for TV" 106, displaying the eye command necessary for operating the TV receiver, as shown for example in FIG. 9, before proceeding to step ST7.

At step ST7, CPU1 checks if user has selected one of the eye commands "numeral" 106a, "sound volume up" 106b, "sound volume down" 106c, "channel up" 106d and "channel down" 106e corresponding to the desired operations. If the result is YES, CPU 1 passes to step ST8 and, if otherwise, CPU 1 remains in a standby state.

At step ST8, CPU 1 reads out the remote control data corresponding to the contents of operations selected at step ST7, from the remote control data previously stored in memory unit 20, to output the remote control data to driver 13 shown in FIG. 1. At this time, CPU 1 outputs a mode changeover signal as e.g. "0" and turns the switches 13a and 13b off and on, respectively. Specifically, CPU 1 transmits to driver 13 remote control data obtained on pulse position modulation (PPM) of the of 33 to 40 kHz carrier wave in accordance with a predetermined code. The result is transmission from the IR LED 14 of remote control signals, for example, remote control signals for increasing the sound volume selected by the user. TV receiver 91 receives these remote control signals to increase the sound volume. Although the remote control signals differ from one machine type to another and also from producer to producer, a variety of equipment produced by a number of producers may be remote control led by this personal computer by having the remote control signals associated in advance to various machine types of the various producers stored in advance in ROM 21 or by having these remote control signals stored in RAN 22b by learning.

At step ST9, CPU 1 performs an operation which is the reverse of the operation of step ST1 to check if the window "Remote controller for TV" 106 is closed. If the answer is YES, the program is terminated and, if otherwise, control reverts to step ST7.

On the other hand, at step ST10, CPU 1 causes the window "Remote control for VTR" indicating eye commands necessary for VTR to be opened before proceeding to step ST11.

At step ST11, CPU 1 reads out remote control data necessary for remote control of VTR from memory unit 20, in association with the steps ST7 to ST9, to transmit the remote control signals for VTR.

On the other hand, CPU 1 causes the window "Remote controller for VTR", indicating eye commands necessary for VTR operation, to be opened, before proceeding to step ST11.

At step ST12, CPU 1 causes the window for "Remote control for audio", indicating the eye commands necessary for operation of audio devices, to be opened, before proceeding to step ST13.

At step ST13, CPU 1 reads remote control data necessary for remote control of audio devices from memory unit 20, in association with steps ST7 to ST9, to transmit remote control signals for audio devices.

This enables remote control of the equipment which may be remote controlled by IR rays, such as video tape recorder, audio equipment etc.

Figure 10:
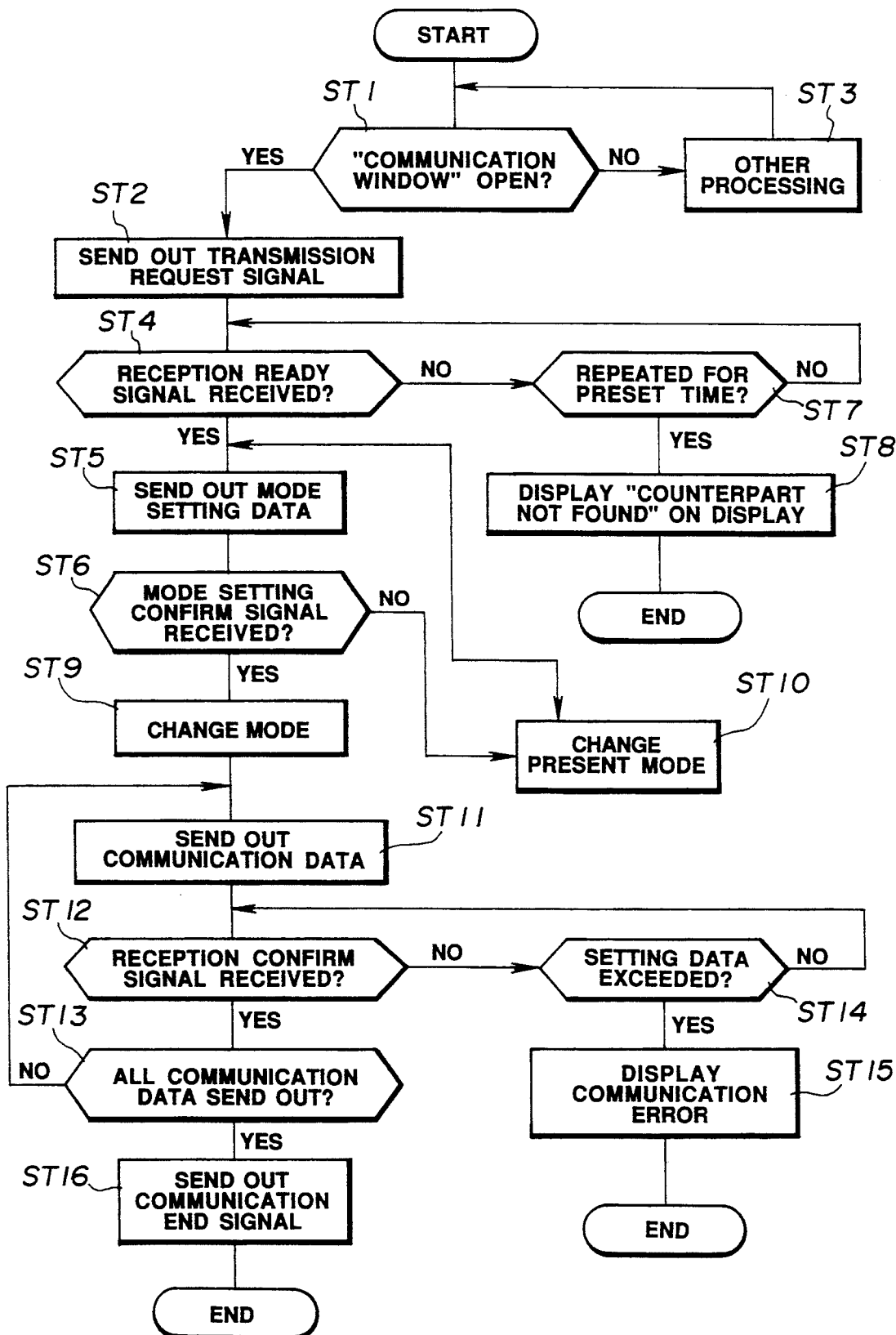
FIG. 10 is a flow chart for illustrating the operation in the data communication mode of the CPU as a component part of the information processing apparatus.

Referring to a flow chart shown in FIG. 10, the operation of the CPU 1 in the above-described data communication mode is explained.

At step ST1, CPU 1 checks if user has carried out an operation of setting the data communication mode and the window "communication" has been opened on a screen 100. If the answer is YES, control passes to step ST2 and, if otherwise, control reverts to step ST1 after having performed other operations. More concretely, if user puts pen 35 on the eye command "communication" 103 displayed on the eye command area 101 shown in FIG. 7, shifts pen 35 directly to input display area 104 to put pen 35 thereat, CPU 1 senses these pen-down and pen-up operations in the manner described above to open the window "communication" before passing to step ST2.

Figure 11:
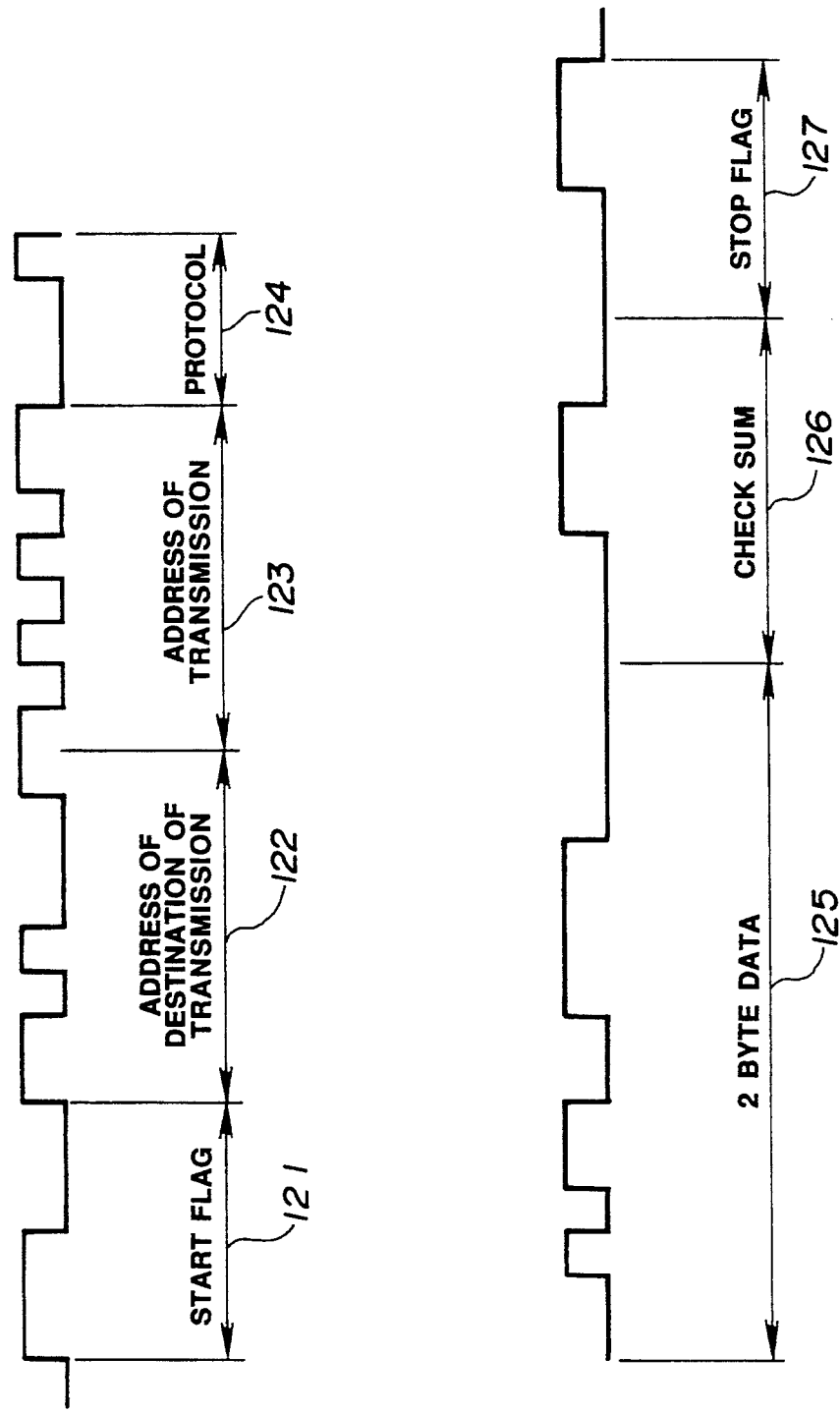
FIG. 11 shows the format of transmission data.

If user inputs at step ST2 an address of a destination indicating a personal computer of a desired destination in the window "communication", CPU 1 transmits a request signal, added to by the transmitter's address, as the transmission data, to level modulator 11 shown in FIG. 1, while transmitting a mode changeover signal, set to, for example, 1, and turning the switches 13a, 13b on and off, respectively, before passing to step ST4. Specifically, the format of the transmission data consists of a 6-bit start flag 121, a 1-byte address of destination of transmission 122, a 1-byte address of transmitter 123, a 4-bit protocol 124, 2-byte data 125, a 1-byte check sum 126 and a 6-bit stop flag 127, as shown in FIG. 11. The upper three bits and the lower three bits of the start flag 121 are fixed at 0 and 1, respectively, whereas the upper three bits and the lower three bits of the stop flag 127 are fixed at 1 and 0, respectively. The protocol 124 is used for discriminating types of data 125, such as a request signal, communication data or communication mode, whereas the check sum 126 is used for error detection and correction.

At step ST4, CPU 1 checks if reception ready signal has been received from the originating personal computer. If the result is YES, control passes to step ST5 and, if otherwise, control passes to step ST7.

At step ST5, CPU 1 transmits mode setting data, necessary for setting the communication mode, such as data transfer rate, or so-called Baud rate, as transmission data, before passing to step ST6.

On the other hand, CPU 1 checks at step ST7 if the step ST4 has been repeated for a predetermined time duration. If the result is NO, control reverts to step ST4 and, if otherwise, control passes to step ST8.

At step ST8, since the reception ready signal is not received after lapse of a predetermined period of time, CPU 1 causes an indication "Counterpart not found" to be displayed on the screen 100 before terminating the program.

At step ST6, CPU 1 checks if a mode setting confirmation signal has been received from the transmitting personal computer. If the answer is YES, control passes to step ST9 and, if otherwise, control passes to step ST10.

At step ST9, CPU 1 changes its own communication mode to the communication mode transmitted to a counterpart before proceeding to step ST11. At step ST10, since the mode setting confirmation signal has not been received, the transmitting personal computer decides that the operation is not possible with the communication mode transmitted at the preceding step ST5 and transmits setting mode of a different communication setting mode as the transmission data before reverting to step ST5.

Figure 12:
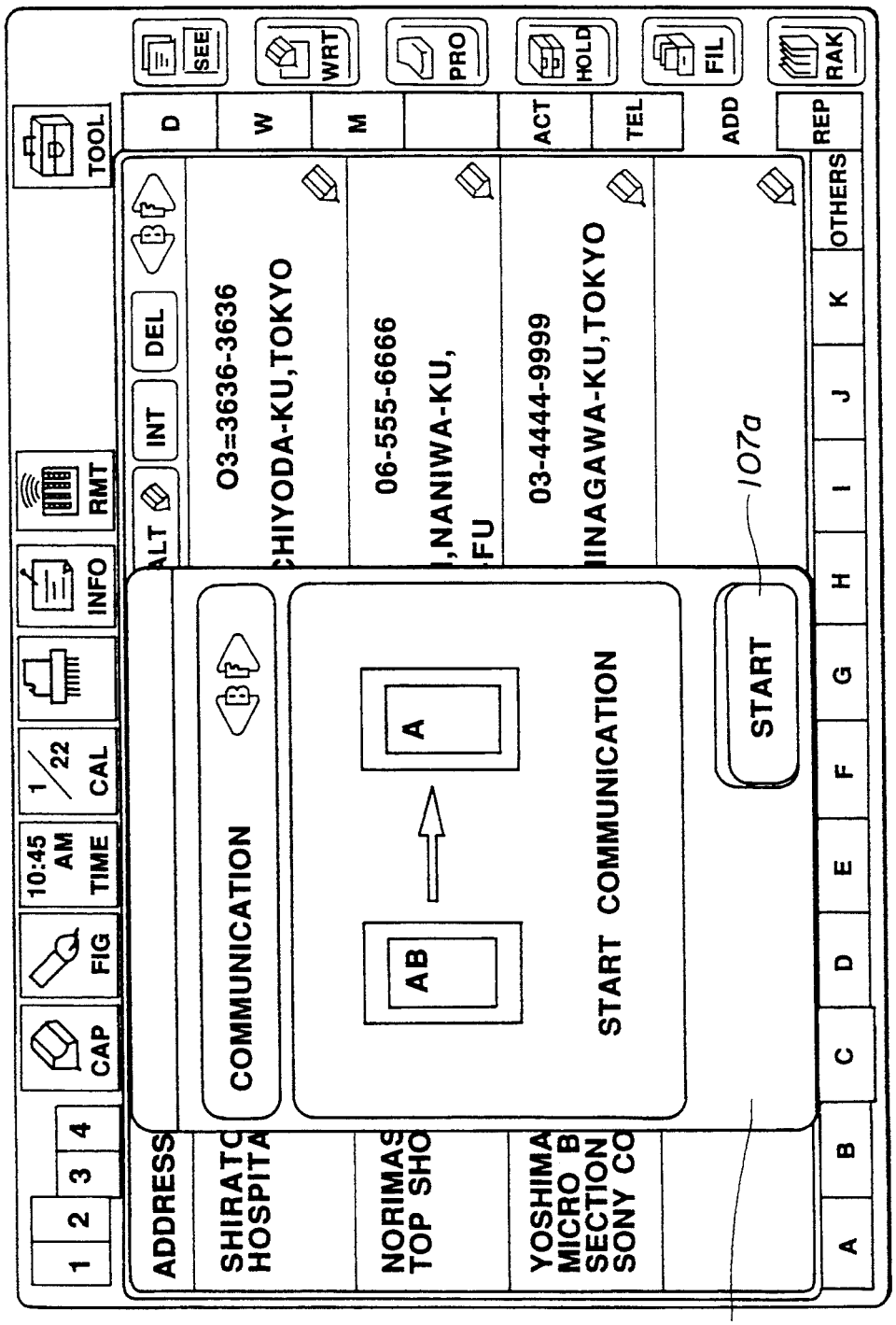
FIG. 12 is a front view showing a further example of a screen display.

At step ST11, CPU 1 causes window "Communication start" 107 to be opened, as shown in FIG. 12. If the user selects a "'start" eye command 107a, CPU 1 causes communication data, such as a file, stored in memory unit 20, to be read out at every two bytes to transmit the communication data as transmission data before passing to step ST12.

At step ST12, CPU 1 checks if the reception confirmation signal from the originating personal computer has been received. If the answer is YES, control passes to step ST13 and, if otherwise, control reverts to step ST14.

At step ST13, CPU 1 checks if all of the communication data has been received. If the answer is YES, control reverts to step ST12 and, if otherwise, control reverts to step ST15.

CPU 1 checks at step ST14 if the step ST12 has been repeated for a predetermined time duration. If the result is NO, control reverts to step ST12 and, if otherwise, control passes to step ST15.

At step ST15, since the reception confirmation signal has not been received after lapse of a preset time, CPU 1 causes a display "Communication error" to be put on screen 100 before terminating the program.

At step ST16, CPU 1 transmits a communication end signal indicating that the communication has been terminated, before terminating the program.

Figure 13:
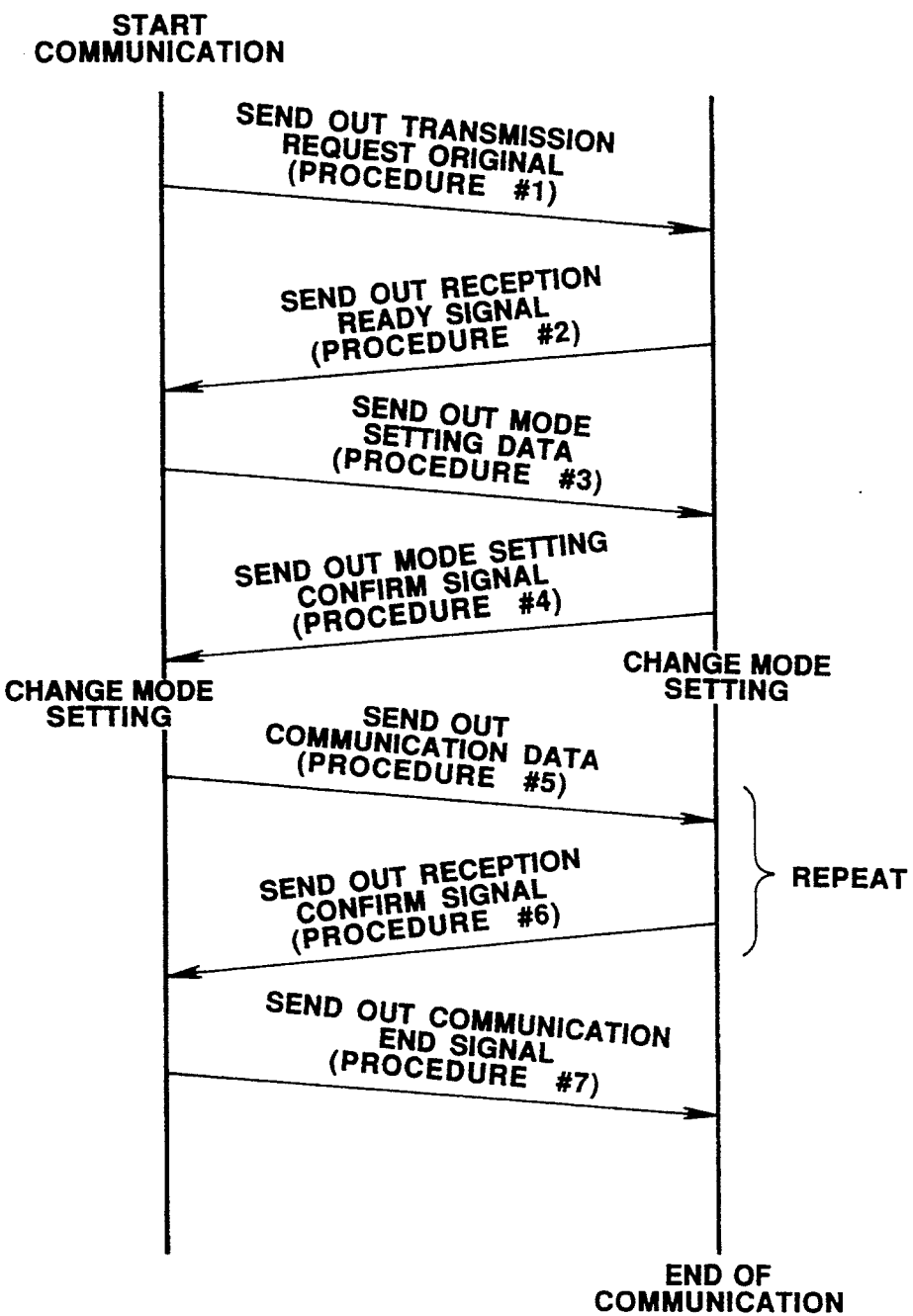
FIG. 13 is a front view showing the flow of communication.

That is, data communication between the personal computers is performed in accordance with the communication flow shown for example in FIG. 13. In FIG. 13, the left-side flow and the right-side flow show a flow of the originating personal computer and a flow of the destination of transmission, and the steps #1, #2, #3, #4, #5, #6 and #7 correspond to the above-mentioned steps ST2, ST4, ST5, ST6, ST11, ST12 and ST16, respectively.

While data communication between personal computers is carried out in the above-described manner, printing or recording by a disc apparatus of files etc. recorded in the personal computer may be performed by employing peripheral devices, such as the printer or the disc apparatus, as originating equipment.

In the above-described embodiment, CPU 1 has the data communication mode and the remote controlling data transmission mode and not only generates transmission data but also controls the driver 13 to select modulated signals from modulator 12 in the data communication mode and remote control data as transmission data in the remote control data transmission mode for outputting IR rays modulated by the selected modulated signals or by remote control data for effecting data communication between personal computers and remote controlling of TV receivers etc. using a sole IR LED, In other words, only one IR LED and only one driver circuit suffice to reduce costs and size of personal computers.

Meanwhile, data communication between personal computers and remote controlling of TV receivers is performed in the above-described embodiment using the sole IR LED 14, that is using infrared rays of a sole wavelength. However, in certain systems, the wavelength of infrared rays employed in data communication between the personal computers differs from that of infrared rays employed for remote controlling TV receivers or the like.

Figure 14:
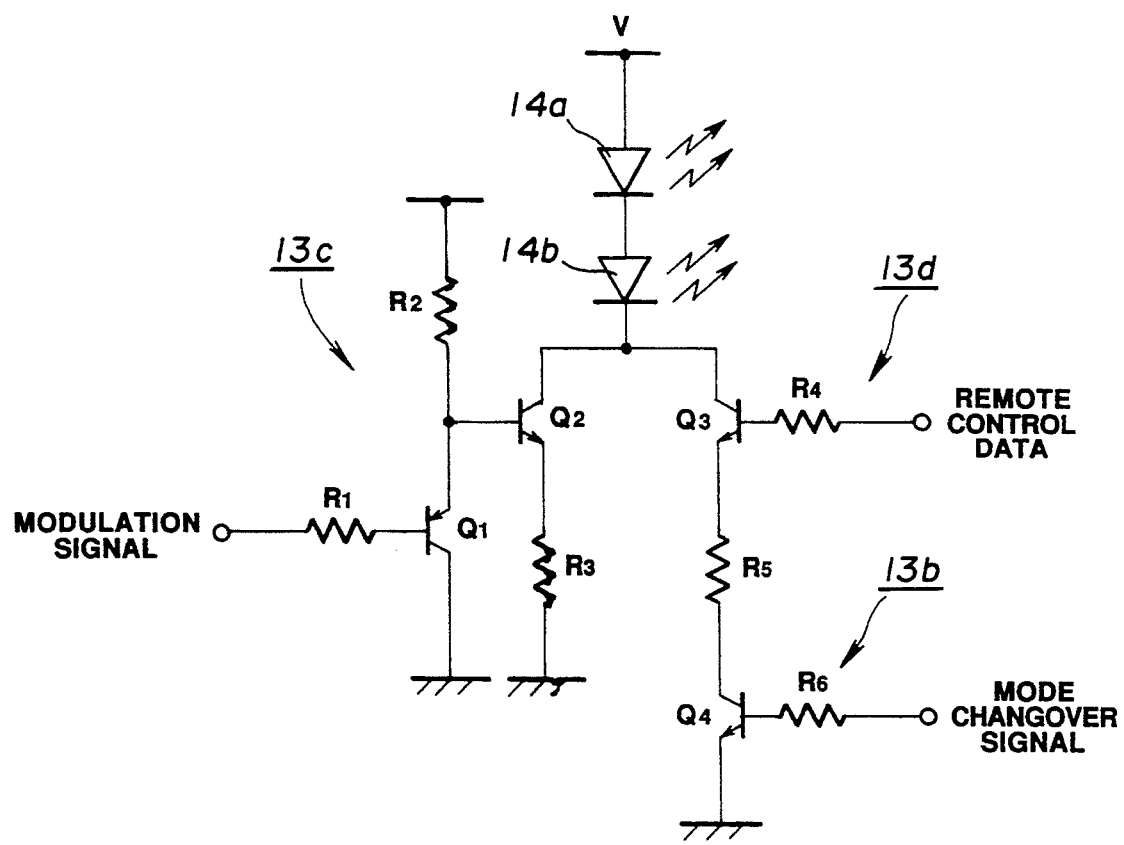
FIG. 14 is a circuit diagram showing another example of an IR LED as a component part of the information processing apparatus.
Figure 15:
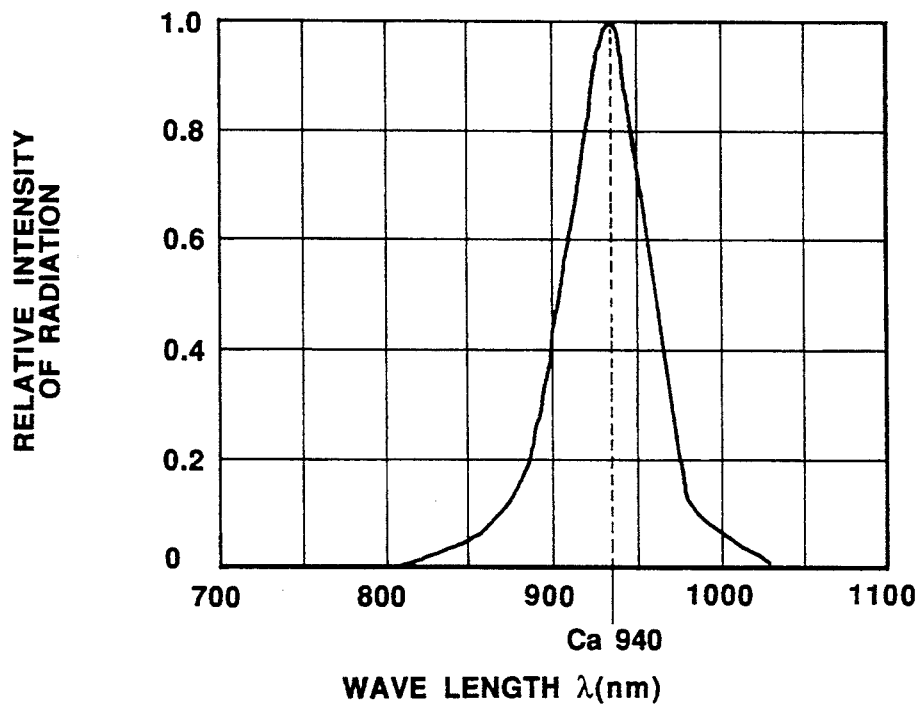
FIG. 15 is a graph showing wavelength characteristics of the IR LED for remote control.
Figure 16:
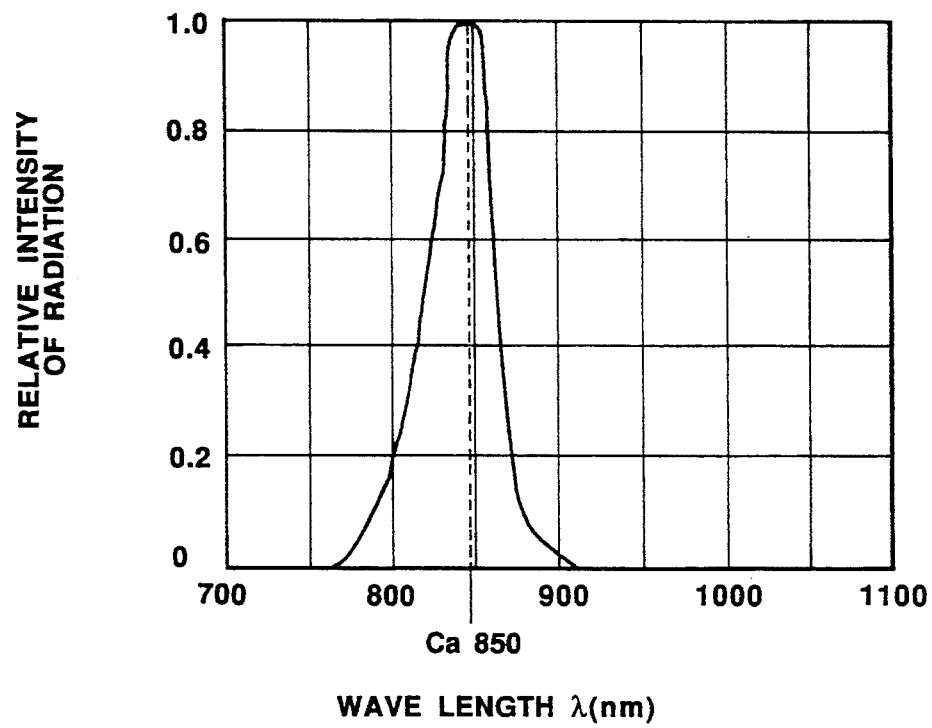
FIG. 16 is a graph showing wavelength characteristics of the IR LED for data communication.

For such system, at least two IR LEDs radiating infrared rays having different wavelengths, for example, an IR LED 14a for remote controlling and an IR LED 14b for data communication, connected in series with each other, are employed as shown in FIG. 14. In the data, communication mode, the two wavelengths modulated by the modulating signals, that is the infrared rays having the wavelength of approximately 940 nm for remote control and the infrared rays having the wavelength of approximately 850 nm for data communication, as shown in FIGS. 15 and 16, are outputted simultaneously, whereas, in the remote control data transmission mode, the infrared rays of these wavelengths modulated by the remote control data are outputted simultaneously so that the receiving personal computer receives the 850 nm infrared rays modulated by the modulation signals to effect data communication, while the TV receivers etc. receive the 950 nm infrared rays modulated by the modulation signals by way of effecting remote control. That is, even with the system in which the wavelength of the infrared rays employed for data communication between personal computers differs from that of the infrared rays employed for remote control of TV receivers or the like, data communication between personal computers and the remote control of the TV receivers or the like may be performed by adding a sole IR LED to the arrangement of the preceding embodiment, leading to lower costs and reduced size of the personal computers. Meanwhile, a system employing three or more wavelengths can easily be coped with by adding a further IR LED having a different wavelength.

Meanwhile, although the interfacing unit 10 is housed in the above embodiment within the personal computer, the IR interfacing unit 10 may be designed as an independent unit and used as a modem. That is, data communication between personal computers and the remote control of the TV receivers may also be achieved by constituting the modem by a modulator 12 for modulating the transmission data by a predetermined modulation system, such as FSK modulation, a driver 13 for changing over between and selecting the transmission data or the modulated data from the modulator 12, and an IR LED 14 output, ting infrared rays modulated by the modulating signals from modulator 12 or by the transmission data, and by supplying communication data or the remote control data to the modem as transmission data from the personal computer.

Figure 17:
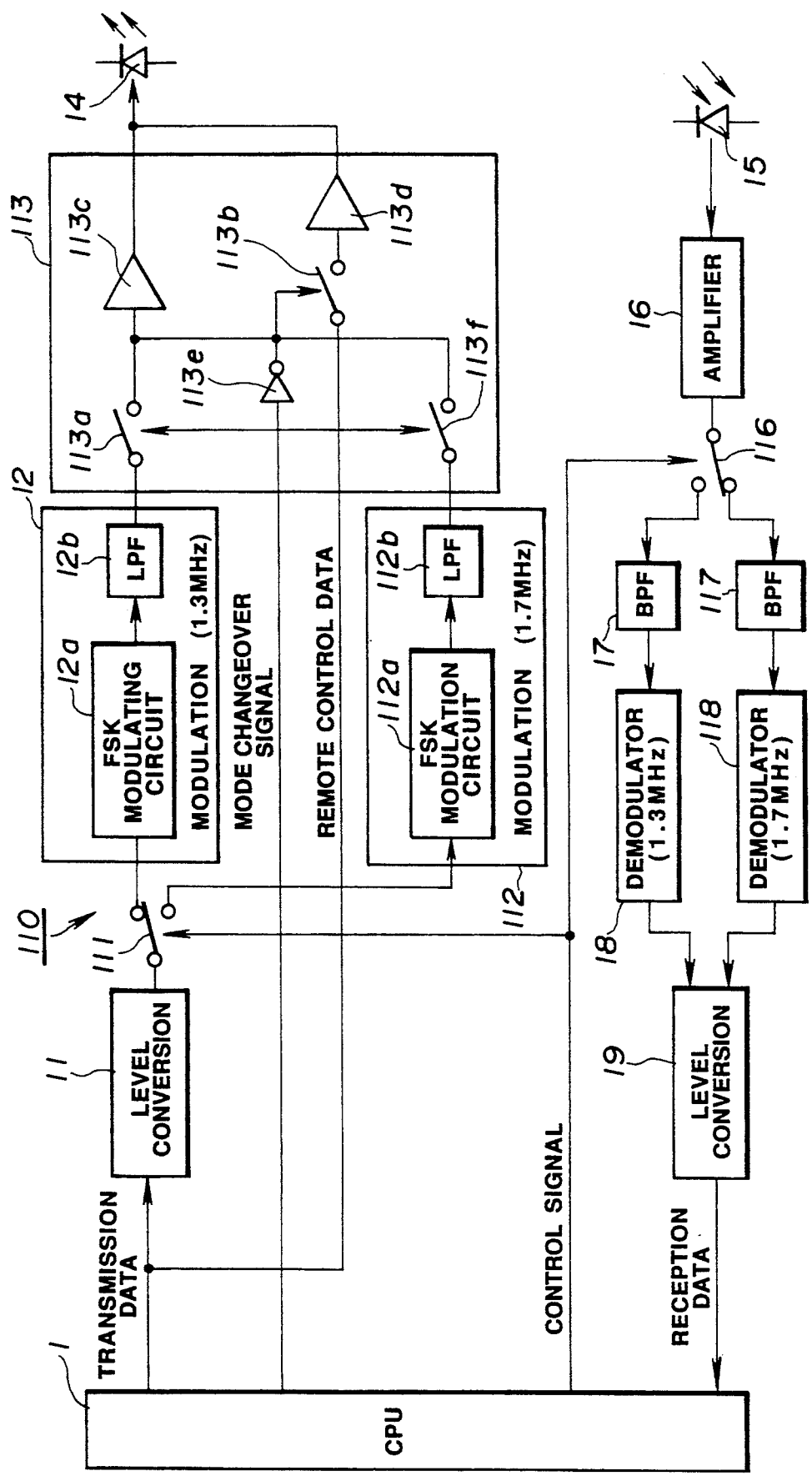
FIG. 17 is a block diagram showing another circuit arrangement of the information processing apparatus according to the present invention.

Another concrete circuit arrangement of the IR interfacing unit 10 shown in FIG. 2 is explained. The arrangement shown in FIG. 1 is that for a so-called half-duplex mode, while the arrangement shown in FIG. 17 is that for a full duplex mode communication, shown in block diagrams. The circuits which is the same as that shown in FIG. 1 is indicated by the same reference numerals and the detailed description is omitted for clarity.

The IR interfacing unit 110 is made up of a level converter 11 for converting the level of the transmission data from CPU 1, modulators 12, 112 for modulating the level-converted transmission data from level converter 11 with a predetermined modulation system, a changeover switch 111 for changing over and distributing the level-converted transmission data from level converter 11 between the modulators 12 and 112, a driver 113 for changing over between and selecting the transmission data or the modulation signals from modulator 12 or 112 and amplifying the selected signals, an IR LED 14 for outputting infrared rays modulated by the transmission data or the modulation signals selected by driver 113, a photodiode 15 for converting the infrared rays sent from other personal computer into electrical signals, BPFs 17, 117 for transmitting predetermined band components of the RF signals amplified by amplifier 16, demodulator 18, 118 for demodulating the RF signals freed of noise components for reproducing reception data, and a level converter 19 for converting the level of the reception data from demodulator 18 or 118 into a predetermined level.

The modulator 112 is constituted by a predetermined modulating circuits, such as FSK modulating circuit 112a and an LPF 112b. The FSK modulating circuit 112a is constituted by a voltage-control led oscillator for changing the oscillation frequency using, for example, a varicap diode, and shifts the carrier waves of e.g. 1.7 MHz to 1.75 MHz from 1 MHz of the transmission data. The modulated signals, obtained in this manner, are freed of high frequency components by LPF 112b having a cut-off frequency of 2.5 MHz before being supplied to driver 113. Meanwhile, the modulation system of the modulator 112 may be any of a variety of digital modulation systems, such as PSK modulation, MSK modulation system or CMSK modulation system, in addition to the above-mentioned FSK modulation system.

The driver 113 is made up of a switch 113a for turning an output of the modulator 12 on and off based on the mode changeover signal from CPU 1, a switch 113f for turning the transmission data from CPU 1 on and off based on the changeover signal from CPU 1, an amplifier 113c for amplifying outputs of switches 113a, 113f for driving the IR LED 14, an amplifier 113d for amplifying the output of the switch 113b for driving the IR LED 14, and an inverter circuit 13e for inverting the mode changeover signals from CPU 1 for controlling the switch 113b, as shown in FIG. 17.

The changeover switch 111 is conic rolled by a control signal controlling the originator and the receiver from CPU 1. If a personal computer is the originator, changeover switch 111 supplies transmission data from level converter 11 to modulator 12. If the personal computer is the receiver, transmission data are supplied to demodulator 112. Switches 113a, 113f and 113b are controlled by the mode changeover signals from CPU 1, such that, in the data transmission mode, switches 113a, 113f are turned on, while switch 113b is turned off. On the other hand, in the remote control data transmission mode, switches 113a, 113f are turned off, and switch 113b is turned on. The result is that the IR LED 14 is in the data communication mode, the originator outputting FSK modulated IR rays from modulator 12 and the receiver outputting FSK modulated IR rays from modulator 112. On the other hand, if the IR LED is in the remote control data transmission mode, the originator outputs infrared rays directly modulated by transmission data from CPU 1. That is, full dual mode communication is performed in the data communication mode.

Figure 18:
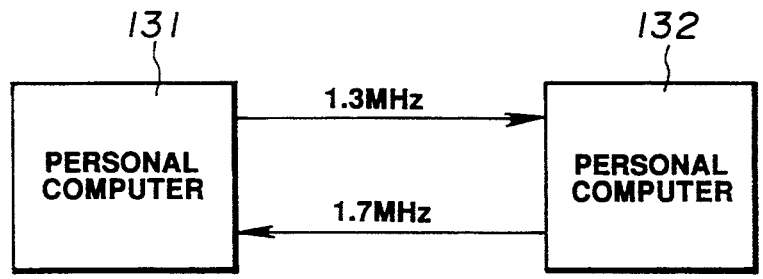
FIGS. 18(a–b) are a diagrammatic view for illustrating a full duplex mode.
Figure 18:
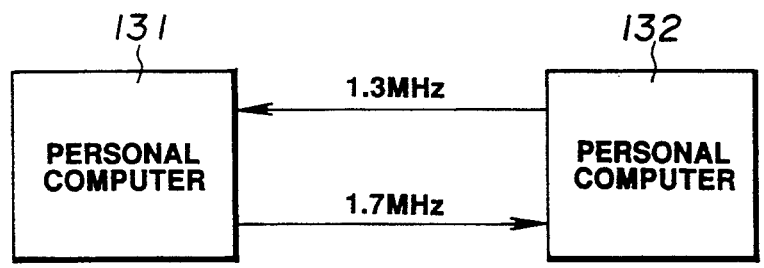

Specifically, if the personal computers 131, 132 are the originator and the receiver, respectively, communication from personal computer 131 to personal computer 132 is carried out using signals produced by FSK modulating the carrier wave of 1.3 MHz, whereas communication from personal computer 132 to personal computer 131 is carried out using signals produced by FSK modulating the carrier wave of 1.7 MHz, as shown in FIG. 18a. On the other hand, if the personal computers 132, 131 are the originator and the receiver, respectively, communication from personal computer 132 to personal computer 131 is carried out using signals produced by FSK modulating the carrier wave of 1.3 MHz, whereas communication from personal computer 131 to personal computer 132 is carried out using signals produced by FSK modulating the carrier wave of 1.7 MHz, as shown in FIG. 18b.

In this manner, the FSK modulated infrared rays or the infrared rays directly modulated by the transmission data are outputted to the personal computer or TV receiver as receivers. The infrared rays transmitted during the remote control data transmission mode are not FSK modulated and hence are not received by the receiving personal computers. If such remote control data are transmitted for remote operation as the transmission data, the TV receiver receives the remote control data to adjust the channel changeover or sound volume adjustment. That is, an equipment which may be remote-controlled by infrared rays, such as TV receiver, may be controlled using the personal computer.

On the contrary, since the infrared rays transmitted during the data communication mode are FSK modulated, the TV receiver etc. is unable to receive the transmission data and hence is not remote control led to permit data communication to be performed between personal computers. Besides, communication may be performed in the full dual mode by employing two kinds of the carrier waves.

The manner of communication between personal computers is hereinafter explained.

Figure 19:
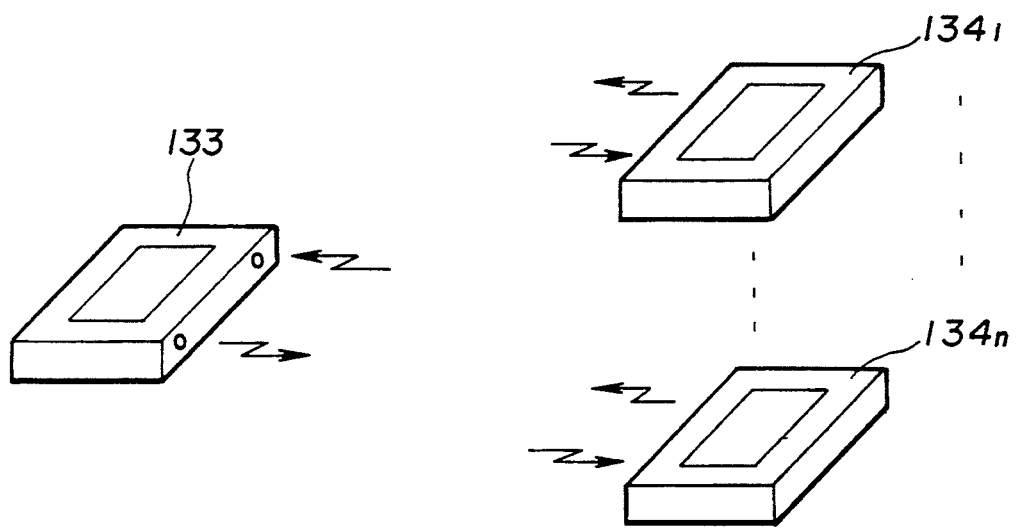
FIG. 19 is a perspective view showing a typical manner of communication between personal computers.
Figure 20:
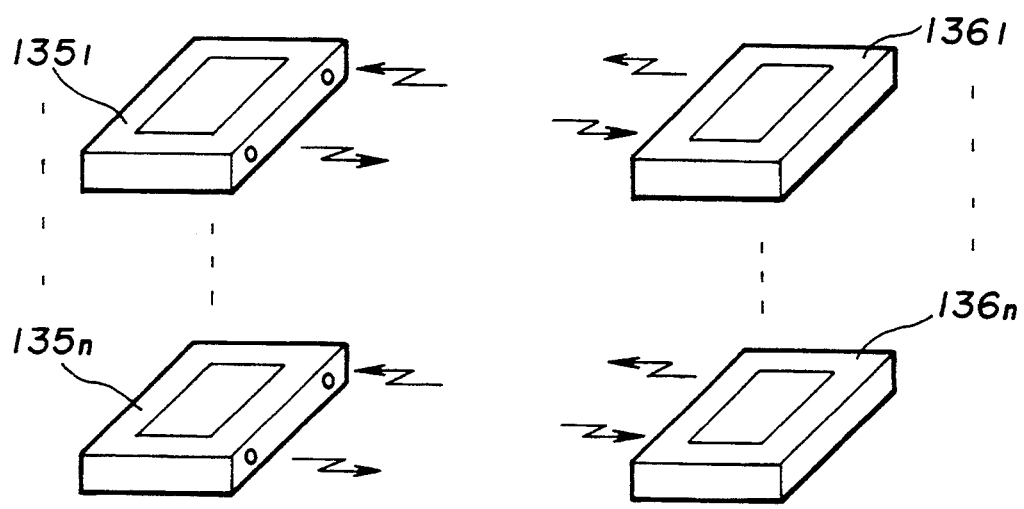
FIG. 20 is a perspective view showing another typical manner of communication between personal computers.

For example, 1:n communication may be achieved by a master personal computer 133 controlling the communication between the master personal computer 133 and slave personal computers 134$_i$, as shown for example in FIG. 19.

Besides, n:n communication may also be achieved by employing an accessing system in which communication between personal computers $135_i$ and personal computers $136_i$ by using a common transmission line, herein an aerial transmission line, such as, for example, carrier sense multiple access/collision detection system or a token access system.

It will be appreciated from the foregoing that the present invention provides a modulation/demodulation system in which data communication between personal computers or remote control of TV receiver may be achieved using one and the same infrared rays radiating means by outputting infrared rays modulated by modulated signals modulated in accordance with a predetermined modulation system, such as FSK modulation, or by transmission data, such as remote control data. In other words, only one IR Fays radiating means and only one driver circuit suffice to reduce production costs.

Besides, in the information processing apparatus according to the present invention, data communication between personal computers and remote control of TV receiver or the like may be achieved using only one infrared light radiating means by controlling the changeover means for selecting the modulated signals from modulating means and transmission data during the first operating mode and the second operating mode, respectively, for outputting infrared rays modulated by the modulated signals modulated in accordance with a predetermined modulation system, such as FSK modulation, and the infrared rays modulated by the transmission data, such as the remote control data, during the first and second operating modes, respectively. In other words, only one infrared ray radiating means and only one driver circuit suffice to reduce costs and the size of the information processing apparatus.

In addition, by employing at least two infrared rays emitting devices outputting infrared rays of different wavelengths, data communication between personal computers and the remote control of the TV receivers may be achieved reliably even with a system in which data communication between personal computers and remote control of e.g. TV receiver are effected using infrared rays of different wavelengths.

What is claimed is:

1. An information processing apparatus comprising
    a) central processing means having first and second operating modes and adapted for generating transmission data,
    b) modulation means for modulating transmission data supplied from said central processing means wherein said modulation means comprises a frequency shift keying modulating circuit,
    c) changeover means for selecting and outputting one of either the modulated signals outputted from said modulation means or unmodulated transmission data from said central processing means, and
    d) infrared light emitting means for emitting infrared light associated with output signals of said changeover means, directly to an external peripheral device,
    e) said central processing means causing said changeover means to select the modulated signals from said modulating means in said first operating mode and said unmodulated transmission data in said second operating mode, respectively.

2. The information processing apparatus as defined in claim 1 further comprising input means for designating said first operating mode or said second operating mode, said central processing means having its operating mode determined in accordance with the operating mode designated by said input means.

3. The information processing apparatus as defined in claim 1 further comprising display means for displaying an operational guide for indicating an operating sequence for said first operating mode and an operational guide for indicating an operating sequence for said second operating mode, said central processing means having its operating mode determined in accordance with the operating mode designated by said input means, said central processing means controlling the contents of an operating display on said display means.

4. The information processing apparatus as claimed in claim 1 comprising
    a) central processing means having a data communication mode and a remote control operating mode and adapted for generating transmission data for data communication and transmission data for remote control,
    b) modulation means for modulating said transmission data for data communication supplied from said central processing means wherein said modulation means comprises a frequency shift keying modulating circuit,
    c) changeover means for selecting and outputting one of the modulated transmission signals outputted from said modulation means and said transmission data for remote control supplied from said central processing means, and
    d) infrared light emitting means for outputting to an external device the infrared light corresponding to the transmission data for data communication or transmission data for remote control-as selected by said modulation means,
    e) said central processing means controlling said changeover means for selecting the transmission data for data communication from said modulating means in said first operating mode, and said transmission data for remote control in said second operating mode.

5. The information processing apparatus as claimed in claim 4 further comprising input means for designating said data communication mode and said remote control operating mode, said central processing means having its operating mode determined in accordance with the operating mode designated by said input means.

6. The information processing apparatus as defined in claim 4 further comprising display means for displaying an operational guide for indicating an operating sequence for said data communication mode and an operational guide for indicating an operating sequence for said remote control operating mode, said central processing means having its operating mode determined in accordance with the operating mode designated by said input means, said central processing means controlling the contents of an operating display on said display means.

7. The modulation/demodulation apparatus as claimed in claims 1 or 4 wherein said changeover means comprises a switching device turned on and off by a mode changeover signal supplied from the central processing means.

8. The modulation/demodulation apparatus as claimed in claims 1 or 4 wherein said infrared light emitting means comprises a sole infrared light emitting device.

9. The modulation/demodulation apparatus as claimed in claims 1 or 4 wherein said infrared light emitting means comprises at least two infrared light emitting devices outputting infrared rays having different wavelengths.

10. The modulation/demodulation apparatus as claimed in claim 9 wherein said infrared light emitting means comprises a series connection of at least two infrared light emitting devices outputting infrared rays having different wavelengths.

11. The modulation/demodulation apparatus as claimed in claim 9 wherein said infrared light emitting means comprises at least two infrared light emitting devices outputting infrared rays having wavelengths corresponding to wavelengths receivable by plural receivers.

12. A modulation/demodulation apparatus comprising,
   a) modulation means for modulating transmission data supplied from a central processing means wherein said modulation means comprises a frequency shift keying modulating circuit,
   b) changeover means for selecting and outputting either modulated signals outputted by said modulating means or unmodulated transmission data supplied from said central processing means, and
   c) infrared ray emitting means for outputting infrared rays associated with output signals from said changeover means directly to an external device.

13. A modulation/demodulation apparatus comprising,
   a) modulation means for modulating transmission data for data communication supplied from a central processing means wherein said modulation means comprises a frequency shift keying modulating circuit,
   b) changeover means for selecting and outputting the modulated transmission signals for data communication outputted by said modulating means and unmodulated transmission data for remote control supplied from a central processing means, and
   c) infrared light emitting means for outputting infrared rays associated with the transmission data for data communication or the unmodulated transmission data for remote control, as selected by said changeover means.

14. The modulation/demodulation apparatus as claimed in claims 12 or 13 wherein said changeover means comprises a switching device turned on and off by a mode changeover signal supplied from a central processing means.

15. The modulation/demodulation apparatus as claimed in claims 12 or 13 wherein said infrared light emitting means comprises a sole infrared light emitting device.

16. The modulation/demodulation apparatus as claimed in claims 12 or 13 wherein said infrared light emitting means comprises at least two infrared light emitting devices outputting infrared rays having different wavelengths.

17. The modulation/demodulation apparatus as claimed in claim 16 wherein said infrared light emitting means comprises at least two infrared light emitting devices outputting infrared rays having wavelengths corresponding to wavelengths receivable by plural receivers.

18. An information processing apparatus comprising,
   a) central processing means having first and second operating modes and adapted for generating transmission data
   b) modulation means for modulating transmission data supplied from said central processing means wherein said modulation means comprises a frequency shift keying modulating circuit
   c) changeover means for selecting and outputting one of either the modulated signals outputted from said modulation means or unmodulated transmission data from said central processing means, and
   d) infrared light emitting means for emitting infrared light associated with output signals of said changeover means,
   e) said central processing means causing said changeover means to select the modulated signals from said modulating means in said first operating mode and said unmodulated transmission data in said second operating mode, respectively,
   wherein, the information processing apparatus further comprises a display means for displaying an operational guide for indicating an operating sequence for said first operating mode and an operational guide for indicating an operating sequence for said second operating mode, said central processing means having its operating mode determined in accordance with the operating mode designated by said input means, said central processing means controlling the contents of an operating display on said display means, and
   wherein said input means comprises a tablet for coordinate entry having plural transparent electrodes in both the horizontal and vertical directions, said tablet being arrayed in superimposition on said display means.

19. An information processing apparatus comprising:
   a) central processing means having a data communication mode and a remote control operating mode and adapted for generating transmission data for data communication and transmission data for remote control
   b) modulation means for modulating said transmission data for data communication supplied from said central processing means wherein said modulation means comprises a frequency shift keying modulating circuit,
   c) changeover means for selecting and outputting one of the modulated transmission signals outputted from said modulation means and said transmission data for remote control supplied from said central processing means, and
   d) infrared light emitting means for outputting to an external device the infrared light corresponding to the transmission data for data communication or transmission data for remote control-as selected by said modulation means,
   e) said central processing means controlling said changeover means for selecting the transmission data for data communication from said modulating means and said transmission data for remote control in said data communication mode and in said second operating mode, respectively,
   wherein the information processing apparatus further comprises,a display means for displaying an operational guide for indicating an operating sequence for said first operating mode and an operational guide for indicating an operating sequence for said second operating mode, said central processing means having its operating mode determined in accordance with the operating mode designated by said input means, said central processing means controlling the contents of an operating display on said display means, and wherein said input means comprises a tablet for coordinate entry having plural transparent electrodes in both the horizontal and vertical directions, said tablet being arrayed in superimposition on said display means.

20. An information processing apparatus comprising
a) modulation means for modulating transmission data for data communication supplied from a central processing means wherein said modulation means comprises a frequency shift keying modulating circuit,
b) changeover means for selecting and outputting either the modulated transmission signals for data communication outputted by said modulating means or unmodulated transmission data for remote control supplied from a central processing means, and
c) infrared light emitting means for outputting infrared rays associated with the transmission data for data communication and the unmodulated transmission data for remote control, as selected by said changeover means, wherein the central processing means further comprises a display means for displaying an operational guide for indicating an operating sequence for said first operating mode and an operational guide for indicating an operating sequence for said second operating mode, said central processing means having its operating mode determined in accordance with the operating mode designated by said input means, said central processing means controlling the contents of an operating display on said display means, and wherein said input means comprises a tablet for coordinate entry having plural transparent electrodes in both the horizontal and vertical directions, said tablet being arrayed in superimposition on said display means.

21. A modulation/demodulation apparatus comprising
a) modulation means for modulating data signals supplied from a central processing means and producing modulated data signals therefrom, wherein said modulation means comprises a frequency shift keying modulating circuit,
b) changeover means for selecting either the modulated data signals or unmodulated data signals supplied from said central processing means, and outputting the selected data signals, and
c) infrared light emitting means for outputting infrared rays corresponding to the selected data signals.

* * * * *